United States Patent [19]

Danielson et al.

[11] Patent Number: 5,892,971
[45] Date of Patent: Apr. 6, 1999

[54] PORTABLE DATA PROCESSING DEVICE HAVING AN INDICIA READER AND A MULTI-TASKING OPERATING SYSTEM CAPABLE OF EXECUTING BATTERY MONITORING INSTRUCTIONS WHILE CONCURRENTLY EXECUTING APPLICATION PROGRAMS

[75] Inventors: Arvin D. Danielson, Solon; Dennis A. Durbin, Cedar Rapids, both of Iowa

[73] Assignee: Norand Corporation, Cedar Rapids, Iowa

[21] Appl. No.: 448,169

[22] Filed: May 23, 1995

Related U.S. Application Data

[63] Continuation-in-part of Ser. No. 40,313, Mar. 29, 1993, Pat. No. 5,468,947, which is a continuation-in-part of Ser. No. 451,322, Dec. 15, 1989, Pat. No. 5,227,614, which is a continuation-in-part of Ser. No. 143,921, Jan. 14, 1988, abandoned, which is a continuation-in-part of Ser. No. 897,547, Aug. 15, 1986, abandoned, said Ser. No. 40,313, is a continuation-in-part of Ser. No. 947,036, Sep. 16, 1992, Pat. No. 5,308,966, which is a continuation of Ser. No. 875,791, Apr. 27, 1992, abandoned, which is a continuation-in-part of Ser. No. 422,052, Oct. 16, 1989, abandoned, which is a division of Ser. No. 894,689, Aug. 8, 1986, Pat. No. 4,877,949.

[51] Int. Cl.$^6$ ..................................................... G06F 9/38
[52] U.S. Cl. .......................................... 395/827; 395/840
[58] Field of Search ........................ 235/462; 364/708.1; 375/202; 395/673, 893, 827, 840

[56] References Cited

U.S. PATENT DOCUMENTS

| | | | |
|---|---|---|---|
| 4,870,604 | 9/1989 | Tatsuno | 364/708.1 |
| 5,247,677 | 9/1993 | Welland et al. | 395/673 |
| 5,306,900 | 4/1994 | Metlitsky et al. | 235/462 |
| 5,425,051 | 6/1995 | Manhany | 375/202 |
| 5,522,089 | 5/1996 | Kikinis et al. | 395/893 |
| 5,691,528 | 11/1997 | Wyatt et al. | 235/462 |

*Primary Examiner*—Thomas C. Lee
*Assistant Examiner*—David Ton
*Attorney, Agent, or Firm*—Simmons, Perrine, Albright & Ellwood

[57] ABSTRACT

A portable, hand-held data processing assembly of modular structure includes a base unit with a keyboard and a display screen. An indicia reader module is housed in a housing shell which is attachable to the base unit. The indicia reader module can contain a reflected light indicia reader for non-contact essentially instantaneous reading of bar codes of the like disposed in a spaced, non-contacting relationship to the assembly. The indicia reader module can also include a processor. Additionally, the base unit can include a battery for powering the hand-held data processing assembly. A data collection and communications module can include a stacked arrangement of a communications interface main circuit board, a radio and a laser scanner assembly which are housed in a housing shell attachable to the base unit. A support frame and a plurality of ground planes in the sandwiched main circuit board and a routing circuit board form an RF cage for shielding RF interference which may be generated by the radio. Also disclosed is a method for reducing the operational power consumption requirements of laser bar code scanners by analyzing reflected laser light in order to determine the presence of optically readable information sets. In any described embodiment, the hand-held data processing assembly can include a multitasking operating system. The multitasking operating system can execute battery monitoring instructions and diagnostic routines while concurrently executing application programs.

19 Claims, 24 Drawing Sheets

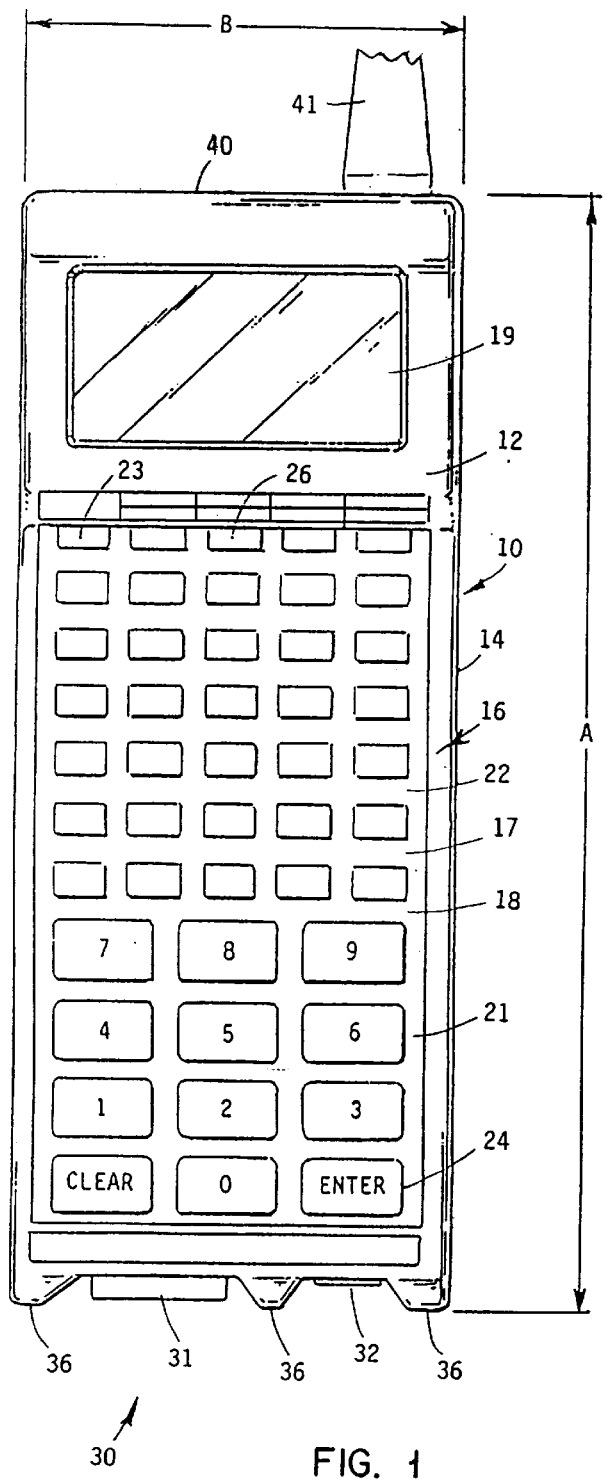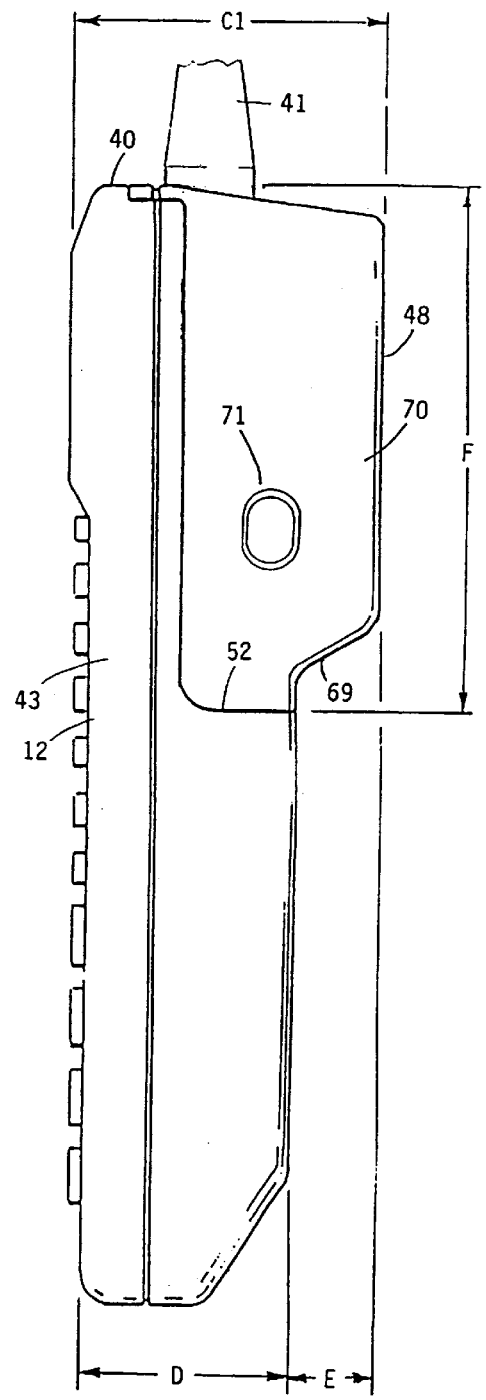
FIG. 1
FIG. 2

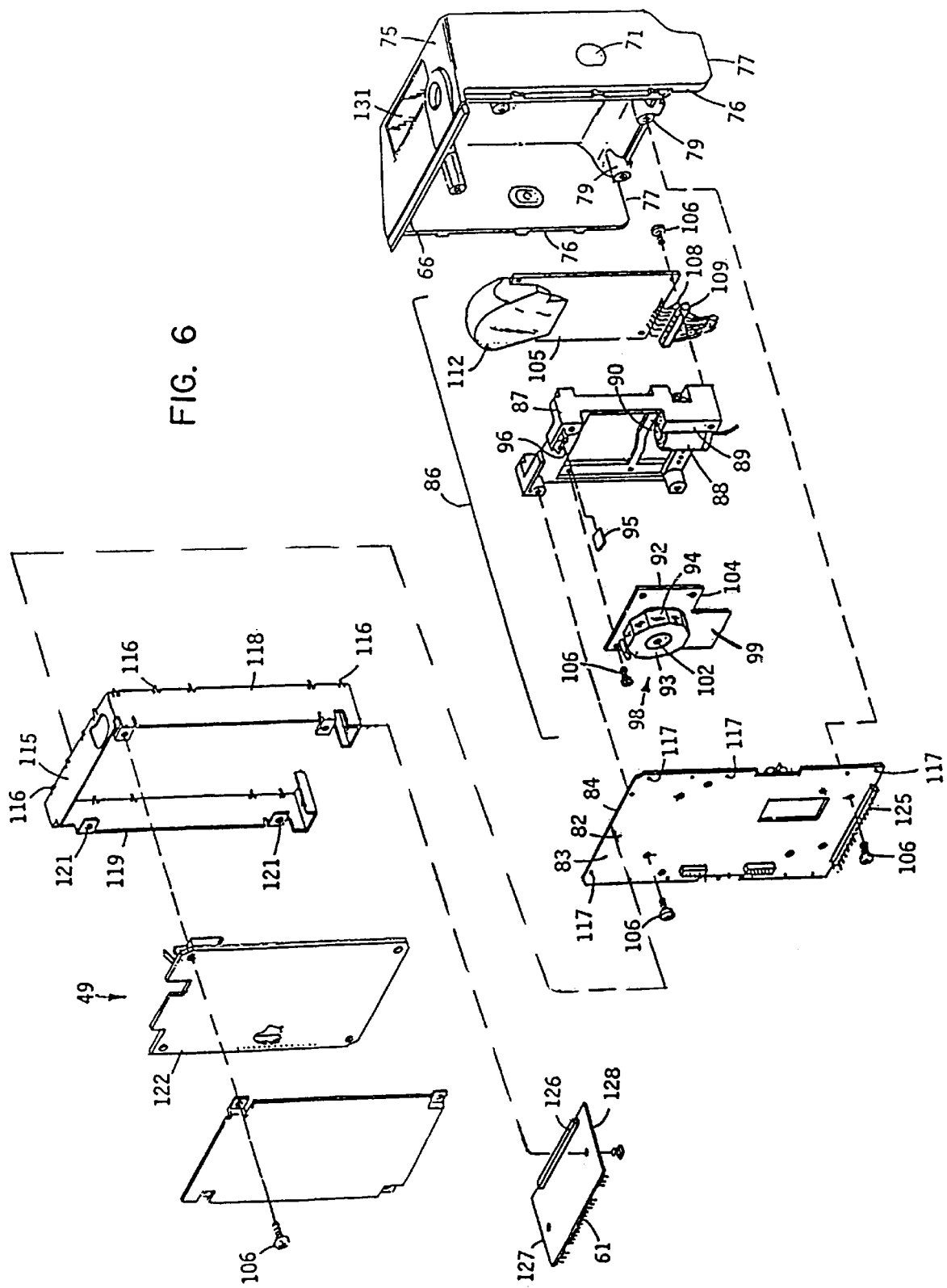

PORTABLE DATA PROCESSING DEVICE HAVING AN INDICIA READER AND A MULTI-TASKING OPERATING SYSTEM CAPABLE OF EXECUTING BATTERY MONITORING INSTRUCTIONS WHILE CONCURRENTLY EXECUTING APPLICATION PROGRAMS

CROSS REFERENCES TO RELATED APPLICATIONS a. Claiming Benefit Under 35 U.S.C. 120

The present application is a continuation-in-part of application Ser. No. 08/040,313, filed Mar. 29, 1993, now U.S. Pat. No. 5,468,947, issued Nov. 21, 1995, which is a continuation-in-part of application Ser. No. 07/451,322, filed Dec. 15, 1989, now U.S. Pat. No. 5,227,614, issued Jul. 13, 1993, which is a continuation-in-part of application Ser. No. 07/143,921, filed Jan. 14, 1988, now abandoned, which is a continuation-in-part of application Ser. No. 06/897,547, filed Aug. 15, 1986, now abandoned, and said application Ser. No. 08/040,313 is further a continuation-in-part of application Ser. No. 07/947,036, filed Sep. 16, 1992, now U.S. Pat. No. 5,308,966, issued May 3, 1994, which is a continuation of application Ser. No. 07/875,791, filed Apr. 27, 1992, now abandoned, which is a continuation-in-part of application Ser. No. 07/422,052, filed Oct. 16, 1989, now abandoned, which is a division of application Ser. No. 06/894,689, filed Aug. 8, 1986, now U.S. Pat. No. 4,877,949, issued Oct. 31, 1989.

b. Incorporation by Reference

The following related commonly owned patent applications are incorporated herein by reference in their entirety, including appendices and drawings:

| Inventor(s) | Ser. No. | Filing Date | U.S. Pat. No. | Issue Date |
| --- | --- | --- | --- | --- |
| Miller, et al. | 07/136,097 | 12/21/87 | | |
| Danielson, et al. | 07/143,921 | 01/14/88 | | |
| Koenck | 07/238,701 | 08/31/88 | 5,019,699 | 05/28/91 |
| Main, et al | 07/321,932 | 03/09/89 | | |
| (for published version of 07/321,932, see continuation disclosure, identified by: | | | | |
| Main, et al. | 07/966,907 | 10/26/92 | 5,216,233 | 06/01/93) |
| Hanson, et al. | 07/346,771 | 05/02/89 | | |
| Hanson, et al. | 07/347,298 | 05/02/89 | | |
| Danielson, et al. | 07/364,902 | 06/08/89 | | |
| (for application including the 07/364,902 disclosure, see: | | | | |
| Danielson, et al. | 07/777,393 | 01/07/92 | issue fee paid) | |
| Chadima, et al. | 07/339,953 | 04/18/89 | 4,894,523 | 01/16/90 |
| Miller, et al. | 07/347,602 | 05/03/89 | | |
| (for published version of 07/347,602, see continuation disclosure, identified by: | | | | |
| Miller, et al. | 08/046,048 | 04/12/93 | 5,331,580 | 07/19/94) |
| Danielson, et al. | 07/422,052 | 10/16/89 | | |
| Koenck, et al. | 07/467,096 | 01/18/90 | 5,052,020 | 09/24/91 |
| Danielson, et al. | 07/626,711 | 12/12/90 | | |
| Koenck, et al. | 07/660,615 | 02/25/91 | 5,218,187 | 06/08/93 |
| Koenck, et al. | 07/987,574 | 12/08/92 | 5,313,053 | 05/17/94 |
| Koenck, et al. | 08/215,115 | 03/17/94 | | |

Further, the following related commonly owned international patent applications are incorporated herein by reference in their entirety:

| Inventor(s) | International Application Number | International Filing Date | International Publication Number | International Publication Date |
| --- | --- | --- | --- | --- |
| Koenck, et al. | US90/03282 | 06/07/90 | WO90/16033 | 12/27/90 |
| Koenck, et al. | US91/00435 | 01/18/91 | WO91/11065 | 07/25/91 |

The entire disclosures of the foregoing publications are incorporated herein by reference.

BACKGROUND OF THE INVENTION

This invention relates to pocket size computer processor system means, and particularly to a plural module computer processor system capable of incorporating various data entry peripheral devices and of coupling with various data storage and data transmission devices while yet being suitable to be carried on the person of an individual user throughout a working day.

A long-standing problem in the hand-held computer field has been to provide a compact and efficient system for data capture while yet achieving low production cost. It is conceived that a breakthrough can be realized by an optimum plural module system configuration.

In another aspect, the invention relates to novel terminal means for association with information cards and is particularly concerned with such terminal means for use by an individual user in communication with another computer system. There are many circumstances for example where an individual may desire to carry out transactions with a central computer processing station. In one example, a racing establishment such as a horse racing organization may desire to enable individual members having accounts with the organization to place bets from various locations such as home or office. In such a circumstance, it would be highly advantageous if the individual could communicate directly with a central computer system placing with the system all the information concerning a bet, and receive from the computer system essentially instantaneous information as to whether such a bet has been accepted. Another example relates to food service functions where orders may be transmitted to a central order processing center, and where credit or debit card purchases may be approved and/or related data stored at the central processor. Still another example is in the field of direct store delivery of merchandise. A pocket size terminal may contain the necessary information concerning the items being delivered and may be coupled with the store computer system to effect a paperless delivery transaction. (Pocket size may here be taken as a terminal with a base perimeter of not more than twelve inches so as to fit in a typical side pocket of a jacket or the like having a depth of e.g. eight inches.)

This invention also relates generally to data collection and processing systems using portable, hand-held data terminals for collecting data, and for selectively processing and communicating collected data to other system elements. More particularly, the invention relates to collection apparatus of such hand-held data terminals. Typical collection processes may include reading data and manually keying in such read data. The present invention relates particularly to apparatus for reading data into the terminal. Known automated reading processes are executed by apparatus which includes scanning readers, for example.

In efforts to adapt data collection terminals to a wider scope of uses, terminals with increased ruggedness over state of the art terminals are bringing advances to the art. However, the usefulness of the data collection terminals may also be increased by further reducing the weight and size of the data collection terminals to sizes and weights below the present lower limits of state of the art terminals. Typically a reduction in size might result in the elimination of at least some desirable features. The use of modular data collection terminals would support the reduction in non-essential features to achieve certain reduction in size and weight.

In the data capture field, there are many applications where hand-held data terminals should be of rugged construction so as to survive rough handling. Many operators are not inclined toward painstaking or precise manipulations. An example is in the use of RF data capture terminals on forklift trucks in factories and warehouses where items to be transported are identified by bar codes. Other examples are found in the fields of route delivery and direct store delivery where many items are handled and the terminal means automates the accounting function. Even in applications where bar code data is transmitted on-line to a central station, it may be desirable for hand-held terminals to be inserted into docking apparatus for the interchange of data signals e.g. the loading of scheduling information or the like into the terminal at the beginning of a working shift. Further where terminal means has memory capacity for accumulating data during a delivery operation or the like, it may be desirable for such data to be transferred to a printer so that a hard copy may be produced. In cases where rechargeable batteries are used, the docking apparatus may provide for the recharging of such batteries at the same time as data communication is taking place.

It is conceived that it would be highly advantageous to provide a data capture system with docking apparatus adaptable to a wide range of terminal means, and which furthermore could be quickly and simply loaded in a relatively foolproof manner, and without requiring attention and care from operators engaged in physically demanding and arduous work routines. A docking apparatus would be desirable that completely avoids the use of mating pin and socket type electrical connections, and that does not rely on a specialized configuration of the terminal, e.g. the provision of an optical scanner tip which may be used for data communication. However, pin and socket type connectors may be utilized.

In connection with the use of portable data systems it is conceived that it would be highly advantageous to be able to readily upgrade a basic hand-held terminal to incorporate bar code scan type readers and various image readers as they are progressively improved and developed. A particular goal would be the implementation of the auxiliary image reader function in a rugged configuration free of moving parts. However, in the case of autofocus readers, the current state of the art may require dynamic components for the sake of optimum compactness and economy.

SUMMARY OF THE INVENTION

Accordingly it is an object of the present invention to provide a plural module system configuration that is adaptable to a wide range of data capture applications while retaining pocket size and utilizing a core computer processor module of standard size and characteristics so as to achieve the economy of large scale production.

In a preferred embodiment the standardized computer processor module is provided with a multi-tasking operating system such that battery monitoring software and diagnostic routines will run at a fixed priority level at all times while a wide range of applications software can be run concurrently without jeopardizing the reliability of the system under extended portable operating conditions.

Preferably the standardized computer processor module is selectively associated with peripheral device shell configurations for adapting the system to specific applications. For example a shell configuration may include a scanner module for reading bar codes and a manual data entry and display means specifically tailored to a particular job such as package tracking, inventory, direct store delivery accounting, or the like. As a specific embodiment, the peripheral device shell may comprise a digitizer input tablet and display means which can receive handwritten input data and provide a desired confirming display. A conversational mode may provide for multiple interpretive displays of successively lesser probability in response to an input character or word which is ambiguous with function key selection of the correct interpretation, or the like. A voice input and/or voice synthesizer shell module is another exemplary embodiment. Again in a conversational mode, the module may repeat input words in synthesized speech and/or provide a visual display thereof whereupon actuation of a function button or the like may instruct the module to present a second most probable selection from its vocabulary.

The handwritten or voice input modules may include a learning program for progressively improving recognition of the individual user's characteristic handwritten or voice input. Physical objects related to a given user application may be assigned respective code words e.g. of eight bits length; thus in the case of a food service function, in a food selection mode, the writing of the letter "P" with a stylus on an input tablet or the spoken word "potato chip" may be stored as the ASCII code for the character P in a special food selection storage. A nonvolatile storage section would enable the translation of the "P" code in food selection mode into the string of characters "potato chips" on the display and/or produce the synthesized speech output "potato chips". In a conversational mode, if there were two or more P items, the shell module could in response to a "P" input, present on the display a listing of the P selections, e.g., as P1, P2, P3, etc., whereupon the user could enter with a stylus or the like the correct numeral "1", "2", "3", etc.

According to an exemplary embodiment, a peripheral device shell may provide a transparent tablet serving as data input and as a display window. A sonic wave digitizer arrangement for example may sense stylus (or finger) position on the tablet. The display may include a graphics liquid crystal display (LCD) behind the transparent tablet for defining a keyboard in a touch data entry mode, and for display of data supplied by touch entry, or by other means such as handwritten input, speech input, optical scanner input, and so on. Keyboard touch selection positions can be labeled by means of icons (pictorial images) where this is most effective. The pocket size unit may be of sealed construction so as to be ideal for meter reading, timber inventory, or any environmentally demanding application.

The computer processor module may be employed with peripheral devices such as printers, laser bar code readers, RF modules, smart card interface modules, disk systems, full travel keyboards, high resolution displays, local area network (LAN) interface modules, etc., and various such devices may be combined in a single self-contained battery powered hand-held unit.

It is also an object of the present invention to provide a terminal means which can be utilized by an individual at various locations for direct communication with another computer system for the purpose of carrying out desired individual transactions.

It is another object of the present invention to provide such a terminal which can be conveniently carried on the person of an individual, for example, in a shirt pocket.

A further object of the invention is to provide a terminal unit which is adapted to incorporate a means for reliably identifying an individual who uses the terminal and wherein the terminal facilitates each step in carrying out the desired transaction.

A feature of the invention resides in the provision of a terminal capable of removably receiving an information card with extensive memory capability and which, together with the terminal, can be held in one hand during entry of information concerning a transaction.

In accordance with a further feature, such a hand-held terminal system may incorporate means for two-way communication with a central computer system, e.g., via telephone lines or a radio frequency link.

In accordance with another feature, such a hand-held terminal system may be provided with a scanner for optically scanning visual information such as bar codes.

In accordance with another feature of the invention, such a hand-held terminal system may have dimensions of width and length comparable to a standard intelligent information card and of thickness to fit in the pocket, such as a shirt pocket.

In accordance with still another feature of the invention, such a terminal configuration is designed so as to be adaptable to a wide variety of applications without change in its basic housing configuration.

The PCT application Serial No. 90/0382, filed Jun. 7, 1990, assigned to and owned by the assignee of the present application, the descriptive matter of which is incorporated herein by reference in its entirety, refers to such a modular hand-held unit and discloses a manner of attaching one functional module to another. The use of functional modules increases the scope of use of the basic data collection terminals by allowing the substitution of a most desirable feature in a particular application for another feature which may have become redundant. The eliminated feature may be least likely to be used in conjunction with the newly added feature. Without increase in size and weight of one type data collection terminal over another, respective functions may be adapted to specific situations. In certain applications, however, selected modules desirably include added features. The addition of such features in accordance with the invention is advantageously accomplished with a minimal size and weight change.

Hence, as contemplated, a laser scanner is added to a data collection terminal unit which typically features a radio frequency transceiver module. In accordance with particular features of the invention, a radio transceiver and a laser scanner are integrated into a single module with only a minimal increase in volume over the volume of a radio transceiver module without the laser scanner unit.

According to another aspect of the invention, rotatively mounted scanning mirrors of a laser scanner are formed about magnetic poles of an armature of a motor for rotating the mirrors.

In accordance with another feature of the invention, electronic elements and physical elements for implementing functions of a laser scanner of the hand-held data collection terminal and electronic coupling circuits for interconnecting the laser scanner with the data collection terminal are disposed in interleaved relationship with electronic components for processing communications between a transceiver and the laser scanner.

Accordingly, it is an important object of the present invention to provide a portable data system wherein technologically advanced image reader devices can be readily accommodated.

In a presently preferred configuration particularly suited for forklift truck applications and the like, a portable data terminal with a rugged surface contact configuration accommodates supply of power by the vehicle when the terminal is placed in a vehicle mount; further, the terminal batteries may receive charge while the terminal is operating from the vehicle power so that full battery capacity is available when portable operation is required. However, other contact means might also be utilized.

In accordance with a further development of the invention, portable terminals, for example, may be quickly removed from the charging system by grasping of the terminal itself followed by a simple lifting extraction.

In accordance with an important aspect of the present invention, a docking apparatus removably receives portable data terminal and code reader means for purposes of data communication, e.g., with a host computer and/or for the recharging of rechargeable batteries. In one potential embodiment the terminal and reader means may have electrical contact pad means generally flush on their exterior. In such an embodiment, an abutting type engagement between the contact pad means and cooperating electrical contact means of the docking apparatus may be used for transmitting charging current such that the typical pin and socket type docking connections are entirely avoided.

In accordance with another aspect of the invention the same basic docking structure may be provided with greater or lesser numbers of contact positions. For example, one type of hand-held terminal intended for on-line RF communication with a host computer may have six contact pads for coupling with a local area network, and may have a nine position electrical connector for compatibility with an earlier type of interface system requiring interfitting of pin and socket connectors; another type of hand-held terminal designed for route accounting applications may have, e.g., twelve external contact pads and be intended for interfacing only with systems having provision for open abutment type interconnection.

The terminal and/or reader receptacle means is preferably arranged so that with the terminal or reader secured therein, each line of the display remains visually observable in a convenient orientation relative to a driver of a vehicle. Also all of the key positions of the keyboard are manually accessible, the legends on the keyboard having an orientation so as to be conveniently readable, e.g. by the driver of the vehicle. In particular the axis of each line of the display and of each row of key positions should be generally horizontal (rather than vertical) and the alphanumeric characters of the display and keyboard legends should be upright (rather than inverted) as viewed by the operator.

Also most preferably the terminal or reader can be inserted into the receptacle with one hand and is securely retained. Ideally the terminal or reader is automatically secured with a snap type action which is perceptible, e.g., audibly and tactually to the operator.

In some instances a resilient bias may serve to firmly position the terminal or reader for steady reliable electrical contact at each abutting type contact position in spite of vehicle jarring and vibration or the like. For enhanced security of retention with the docking apparatus, e.g. in mobile applications, the terminal or reader may be automatically affirmatively retained in its receptacle e.g. by means of a detent type action.

One exemplary embodiment of data capture terminal unit is provided with a plurality of electrically conductive pads generally coplanar with the external surface of the housing. Such electrically conductive pads may be interconnected by internal circuitry to the connector elements of a D-style connector mounted upon the housing end cap such that recharge power and data communication pathways may be made through either or both of the connector means. The electrically conductive pads are positioned such that they may be engaged with mating elements having sufficient resilience to maintain stable electrical contact therebetween while the terminal is in a docking receptacle or the like.

According to another aspect of the invention, a laser light source may provide simultaneous illumination of a complete image line or a complete image column, or a substantial linear segment thereof, facilitating the achievement of a rugged image reader unit preferably without moving parts in the illumination system. In a further development a long range CCD image reader having autofocus capabilities may be utilized with a fan beam for simultaneously illuminating a complete image line over a substantial range of distances.

Various other features and advantages of the data terminal in accordance with the invention will become apparent from the following detailed description, which may be best understood when read with reference to the appended drawings.

INCORPORATION BY REFERENCE

The descriptive matter of the above-referred to PCT International application PCT/US90/03282, filed Jun. 7, 1990, as published under International Publication No. WO 90/16033 on Dec. 27, 1990, which entered the U.S. national stage as Ser. No. 07/777,393 with a filing date of Dec. 6, 1991 and an effective date of Jan. 7, 1992, (now U.S. Pat. No. 5,410,141, issued Apr. 25, 1995), including forty-six pages of specification and nineteen sheets of drawings including FIGS. 1 through 37 is hereby incorporated by reference.

FEATURES OF THE INCORPORATED PUBLISHED APPLICATION

The PCT International Publication No. WO 90/16033, which is incorporated herein by reference in its entirety, refers to a modular hand-held data collection unit and discloses a manner of attaching one functional module to another. The use of functional modules increases the scope of use of the basic data collection terminals by allowing the substitution of a most desirable feature in a particular application for another feature which may have become redundant. The eliminated feature may be least likely to be used in conjunction with the newly added feature. Without increase in size and weight of one type data collection terminal over another, respective functions may be adapted to specific situations. In certain applications, however, selected modules desirably include added features. The addition of such features in accordance with the invention is advantageously accomplished with a minimal size and weight change.

Hence, as contemplated, an image scanner utilizing an image sensor array may be incorporated in a module for a data collection terminal unit which may also include a radio frequency transceiver. In accordance with particular features of the invention, a radio transceiver and an automatic bar code reader with image sensor array and are integrated into a single module.

Various other features and advantages of the data terminal in accordance with the invention will become apparent from the following detailed description, which may be best understood when read with reference to the appended drawings.

BRIEF DESCRIPTION OF THE DRAWINGS

FIG. 1 shows a frontal view of a modular data terminal;

FIG. 2 is a side view of the data terminal shown in FIG. 1;

FIG. 6 is an exploded view of the data collection and communications module:

DETAILED DESCRIPTION OF THE INVENTION

1. Description of FIGS. 1–10

Figure 3:
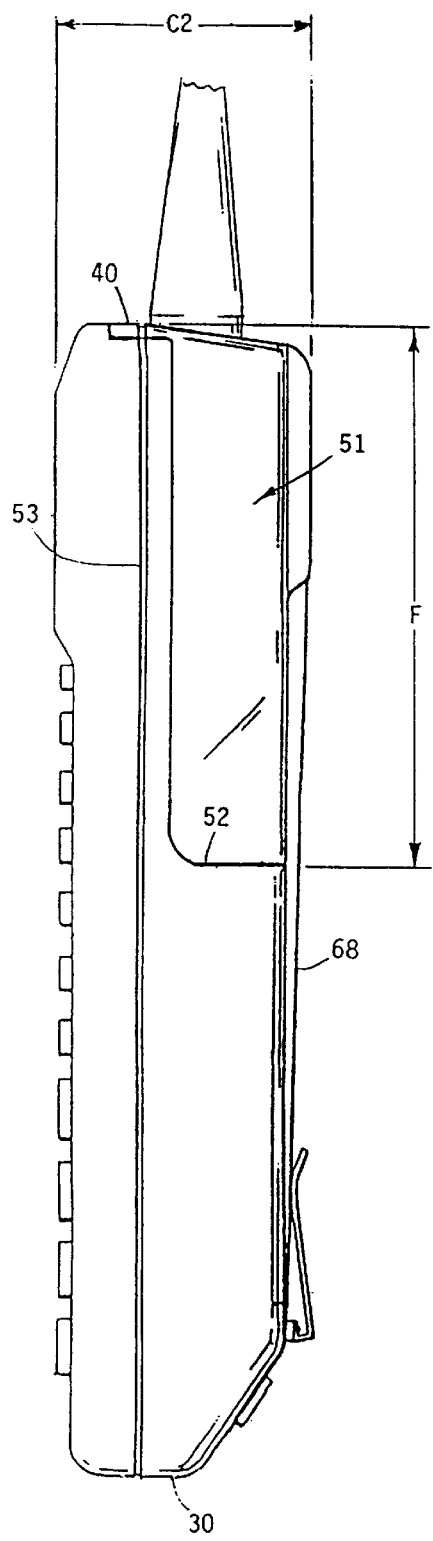
FIG. 3 is a side view of a related data collection terminal having a communications module without a laser scanner.

Referring now to FIGS. 1 and 2, a data collection terminal unit, also referred to herein as data terminal, is designated generally by the numeral 10. As shown in FIG. 1, a frontal face 12 of an elongate housing 14 of a base module 16 of the data terminal 10 typical faces upward and is accessible to the user of the data terminal. The upward facing portion of the module 16 houses a keyboard module 17, including an alphanumerical keyboard 18 and a display screen 19. The display screen 19 is in a preferred embodiment described herein a 4-line by 16-character Reflective Super Twist Liquid Crystal Display (LCD). Of course, other display means may be used in its stead. The keyboard 18 included a lower, standard numerical keyboard section 21, above which is disposed an alphabetical keyboard arrangement 22. An On-Off power key 23 is preferably placed in a leftmost position of an uppermost row on an uppermost row of five keys. The outermost keys 24 in a bottom row are configured as "CLEAR" and "ENTER", while the remaining four keys in the uppermost row are preferably configured as a set of four user-defined function keys 26.

At a bottom end 30 of the housing 14, there are located two connector plugs 31 and 32. The connectors 31 and 32 are protected by adjacent end and interleaved protrusions 36 of the housing 14, which protrusions extend somewhat past the connectors. A preferred embodiment of the data terminal 10 is intended to withstand without damage a drop of about 1.2 meters to a solid surface, such as concrete. The preferred connector 31 is an input-output port, as may be used for such data collection as bar code reading, for example. In such instance, the connector 31 is preferred to be a 9-pin D-subminiature connector with pins interfacing to typical 5 volt scanning peripherals. The connector 32 may be used for accessing external power sources or provide of combined power and data communication. A circular miniature DIN-type connector 32 may be used in the preferred embodiment. A top end 40 of the preferred embodiment of the base module 16 typically may not include connectors. An antenna 41 shown to extend above the top end 40 is further described in reference to FIG. 2. The described frontal, substantially rectangular configuration of the data collection terminal 10 has a length of substantially seven inches (Dimension A=7 inches) and a width of approximately two and three quarter inches (Dimension B=2¾"). The size is convenient to hold the terminal in one's hand, and as seen from FIG. 2, the thickness or depth of the data terminal 10 permits the terminal 10 to be carried about in a potential user's pocket.

FIG. 2 shows depth or thickness features of the data terminal 10. The base module 16 of the data terminal 10 with the described frontal face 12 includes an elongate upper housing portion 43 which defines the longitudinal and lateral extent of the data terminal 10. Attached to the upper housing portion 43 and disposed adjacent the bottom end 30 is a lower battery compartment 44. In the preferred embodiment, the battery compartment 44 is assembled as a lower housing portion to the upper housing portion 43. Adjacent the top end 40 of the data terminal 10 a data collection and communications module 48 is attached to the lower edge of the upper housing portion 43. The antenna 41 as is typical for external antennas extends upward from the data collection and communications module 48 above the top end 40 of the data terminal 10.

One of the features of hand-held data terminals related to this invention and as disclosed in the PCT application PCT/US90/03282 incorporated herein by reference relates to the exchangeability of modules of different shape and varied function. It is of course desirable to have the various modules, though of different shape, substantially of the same size, such that the feel and handling of the family of data terminals 10 remain substantially identical regardless by what features a particular module may be distinguished over another data terminal 10. The data collection and communications module 48 in FIG. 2. includes a radio 49 and laser scanning apparatus 50, the relative positions of which are best referred to in FIG. 5. Externally the presence of the radio module 49 is of course indicated by the presence of the antenna 41 in FIG. 2. The radio module may be a commercially available pretuned 1-watt (UHF) frequency modulated (FM) radio transceiver module, or any similar radio module, such as a Motorola P10tm radio model, for example.

Figure 4:
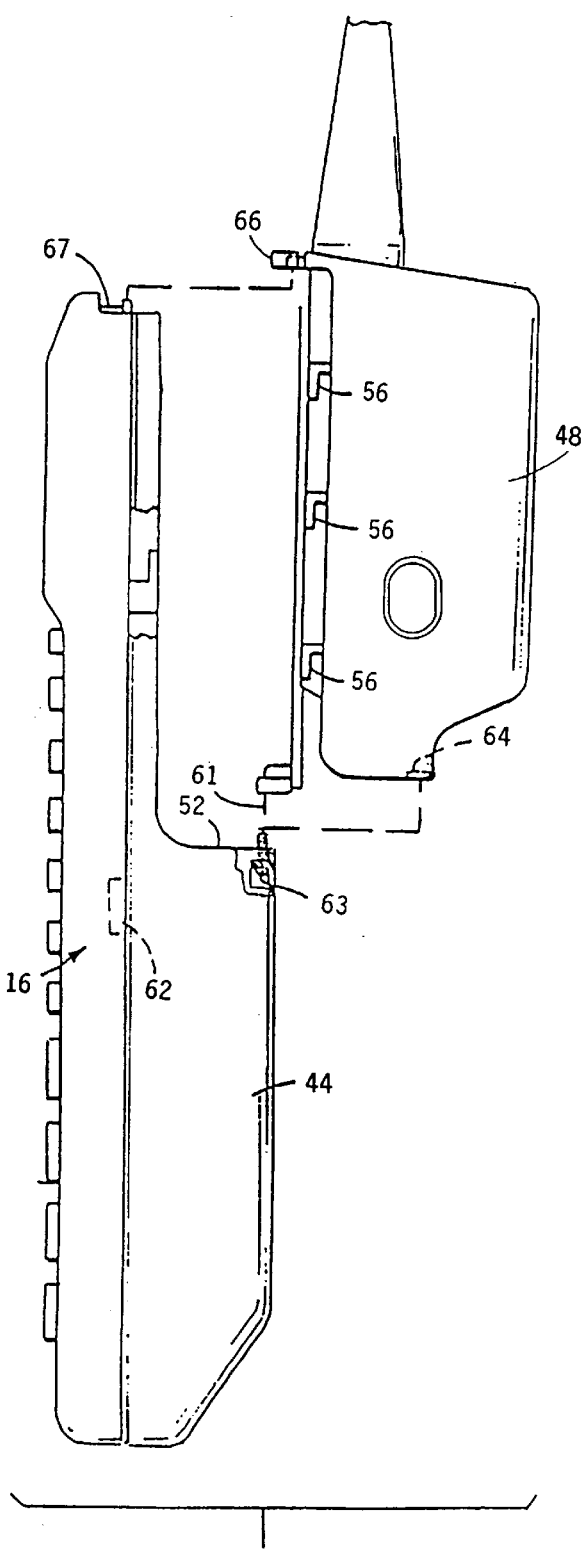
FIG. 4 is a side view of the data terminal shown in FIG. 1, showing somewhat schematically a data collection and communications module.

In accordance herewith it is contemplated to provide the data collection and communications module 48 as a module which is capable of readily replacing another module, such as a radio communications module 51 which is shown in FIG. 3, for example, and which does not include a combined radio and laser scanning function. Each of these interchangeable modules feature a quick exchange mounting mechanism, such as is more clearly illustrated with respect to FIG. 4. As shown in FIG. 4, the data collection and communications module 48 is matched in a contour continuation along a juncture line 52 to the housing 14 adjacent edge of the battery compartment 44 and along a longitudinal parting line 53 of the base module 16. The juncture line 52 defines a cavity within the base module 16 within which modules as the module 48 may be received. The module 48 features a plurality of laterally disposed latching hooks or latch hooks 56 which become engaged by respective latching seats or latch seats 57 disposed along the adjacent edge of the base module 16 when the module 48 is removed toward and into engagement with the adjacent edge and then toward the battery compartment 44, as shown by the arrow. Electrical communication is established via a power and communications connector 61 the pins of which engage a mating connector socket 62 within the base module 16. A set of screws 63 may be tightened through the battery compartment 44 into a set of threaded seats 64 disposed in the adjacent wall of the module 48 to securely retain the attached module as an integrated part of the data terminal 10. At the top end of the data terminal 10, a lip or extending stop edge 66 of the module 55 engages a complementarily shaped seat 67 to securely interlock the data collection and communications module 48 with the base module 16.

FIGS. 2 and 3 depict a comparison of relative depths or thicknesses between the data collection and communications module 48 and the radio communications module 51. The radio communications module 51 is also shown equipped with a preferred hand strap 68 attached longitudinally to the rear of the data terminal 10. Though not presently contemplated for use on the data terminal 10 featuring the data collection and communications module 48, it is clearly possible to use the hand strap 68 on the data terminal 10 having the module 48. As seen in FIG. 3, the radio communications module 51 fits generally with its thickness into the contour of the housing of the data terminal 10. The additional laser scanning apparatus 50 does require an increased thickness or depth in the general contour of the housing 14. However, in accordance herewith, an increase in the thickness of the housing 14 has been minimized, as will become apparent from the further description of the improved arrangement of the laser scanning apparatus 50, but a necessary increase in the depth has been employed to increase the ease of manually holding the data terminal 10 during use. Either of the modules 48 to 51, when seated against the rear of the housing 14, blends with the contour of the housing along the line 52. FIG. 2 shows a thickness of the data terminal 10 at its bottom end of only about 1½ inches (Dimension D), while the thickness at the top end 40 of the data terminal with the data collection and communications module 48 amounts to two inches (Dimension C1=2"). In FIG. 3, both top and bottom ends 40 and 30 of the data terminal 10 with the radio module 51 measure substantially the same depth or thickness of about 1½ inches (Dimension C2=1½"). The increase in the thickness of the module 48 over that of the module 51 (Dimension E=½") is formed in a transition 69 which has been found to advantageously provide a resting ledge for the index finger of a user of the data terminal 10, providing added stability during use of the data terminal 10. With the index finger of the user resting against the transition or ledge 69, the thumb of the user is conveniently located along a lateral surface 70 of the module 48. A pushbutton 71 is disposed in the general area of the lateral surface 70 to be readily accessible for activation by the user's thumb. The pushbutton 71 is hence used to activate a laser scanning operation of the laser scanning apparatus 50. The pushbutton 71 may be duplicated in an identical location on the opposite lateral wall of the module 48. In this manner both left-handed and right-handed users of the data terminal 10 would be able to use the laser operation trigger pushbutton 71. The location of the pushbutton 71 in FIG. 2 denotes both oppositely facing pushbutton locations on the opposite side walls of the module 48. The overall lengths of the modules 48 and 51 are substantially identical (Dimension F=3¼") because of overall longitudinal restraints.

Figure 5:
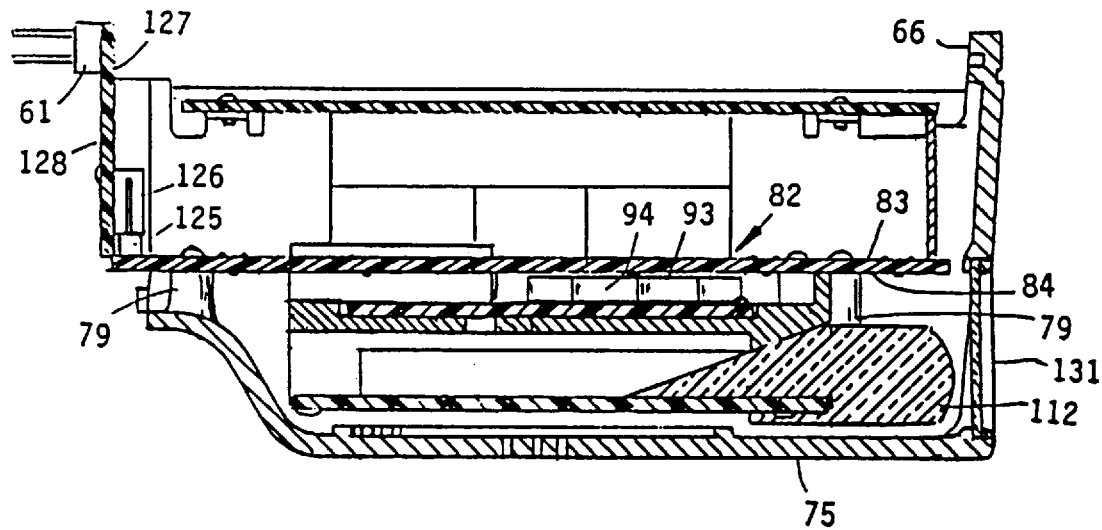
FIG. 5 is a sectional view, showing somewhat simplified a stacked arrangement of a radio, a communications interface main circuit board and a laser scanner assembly.

FIGS. 5 and 6 best illustrate the physical interrelationship between various elements of the radio 49 and the laser scanning apparatus 50 which results in the described minimal increase of the overall thickness of the data collection and communications module 48 over the radio module 51. The module 48 is contained within a molded protective shell 75 of a high impact plastic material, preferably identical to the material employed for the housing 14. The outer contour of the shell 75 also blends into that of the housing 14, such that when edges 76 and 77 and the stop edge 66 are placed and locked against the respectively matching juncture lines 52 and the seat 67, the protective shell forms part of the housing 14. The edges 76 include the latch hooks 56 which lock the shell 75 to the housing 14. An apertured boss, such as indicated at 78 provides a mounting seat for the antenna 41. Interiorly of the shell 75 a plurality of spaced, internally threaded bosses 79 are disposed in a plane to support the mounting of a main circuit board 82, which is also referred to as an analog board 82.

The analog board 82 is a multi-use element, in that it is first of all a circuit board. The circuit board 82 is in particular a four-layer circuit board, having conductive patterns disposed on both major outer surfaces 83 and 84, the conductive patterns including designate sites form mounting electronic components to both sides of the circuit board. Two inner conductive planes provide ground and interconnection planes for the components on the respective outer surfaces of the circuit board 82. The ground plane within the circuit board 82 substantially isolates electrical radio noise from interfering with the laser scanning components and to minimize such radio noise from being emitted from the shell 75.

To the surface 84 of the main circuit board 82 there is mounted a laser scanner submodule 86. The laser scanner submodule 86 includes a mounting frame 87, preferably a molded structure of a high impact plastic. A laser diode 88 is mounted to a support seat 89 of the mounting frame 87. The laser diode is of cylindrical shape, approximately ½ of an inch in diameter and about ¾ of an inch long. The laser diode 88 is a known commercially available element, such as under the designation TOLD 9211 from Toshiba Electric, for example. The laser diode is provided as a fully assembled unit including collimating optics having a lens window 90 through which a collimated laser beam is emitted. The preferred laser diode 88 is of "InGaAlP" material, a known laser material which emits light in the humanly perceivable wavelength range of 670 nanometers. The emitted light is perceived as ruby red, giving the operator of the laser scanner an indication of the operability of the laser and permitting the laser light to be visually "aimed" against indicia such as a bar code to be read. A scanning mirror assembly 92 is placed adjacent the path of the emitted laser beam, such that in a plan view a regular polygon 93 of highly polished mirrors 94 is disposed in the plane of the laser beam emitted from the window 90. The mirrors 94 form a cylinder having a sectional shape of a regular polygon. In the preferred embodiment a total of ten mirrors 94 are evenly spaced about the periphery of the right cylinder. The laser beam impinges on a primary reflector mirror 95 which is typically held in a seat 96 of the frame 87. The scanning mirror assembly 92 is a circuit board mounted assembly of stepping motor assembly 98. The right cylinder appearing in plan view as a regular polygon 93 of the mirrors 94 constitutes an armature of the motor assembly 98. The mirrors 94 are formed in the peripheral wall of the armature of the motor assembly 98. A motor circuit board 99 supports a spindle 102 of the armature 93. The motor circuit board 99 also supports electronic driver components of the motor assembly 98. The scanning mirror assembly 92 is mounted to the frame 87. A cut-out 104 in the circuit board 99 provides clearance between the board 99 and the laser diode 88, such that the mirrors 94 are disposed in the emission plane of the laser diode 88.

An optical analog circuit board 105 is mounted against the frame 87 across from the main circuit board 82 and fastened with typical mounting screws 106 to the frame 87. A typical circuit board connector pin arrangement, such as is shown at 108 may be connected to a typical flat cable 109 to electrically couple the analog circuit board 105 to the main circuit board 82 and to the scanning mirror assembly 92. The circuit board 105 includes circuit elements for receiving and amplifying optical signals which represent reflected signals as a result of the outgoing laser beam from the laser diode 88. The circuit elements include such typical elements as photo diodes which are integrated into receiving optics 112 mounted to the circuit board 105.

Mounted to the surface 83 of the main surface board 82 is a radio support frame 115. The radio support frame 115 is a U-shaped frame which is mounted peripherally about the circuit board 82 extending upward from its surface 83. Formed tongues 116 of the support frame 115 are insertible into apertures 117 of the circuit board 82 to fasten the frame 115 to the circuit board. The frame 115 has a predetermined height between a lower edge 118 and an upper edge 119. Apertured mounting lugs 121 disposed at the upper edge 119 are adapted to receive the threaded fasteners 106. The radio 49 is mounted on a circuit board 122. The circuit board 122 is attached, such as by the fasteners 106, to the lugs 121 of the support frame 115, the height of the support frame 115 spacing the main circuit board 82 and the radio circuit board 122 to accommodate the components on both boards. The support frame in conjunction with the ground plane of the circuit board 82 also forms a radio frequency emission cage about the components of the radio circuit board 122, containing radio frequency (RE) emissions in accordance with regulations. The circuit board 122 may in itself contain RF shielding toward the tip of the formed cage, or separate shielding such as an additional board having a ground plane may be added.

A circuit board connector pin arrangement 125 receives a typical circuit board connector strip 126 of a circuit routing board 127. The circuit routing board 127 routes power and communicative interconnections between the main circuit board 82 and the base module 16. A conductive ground plane 128 of the routing board 127 may preferably be coupled to the support frame 115 to complete the RF cage in conjunction with the support frame 115 and the ground plane of the main circuit board 82.

The assembly of the described elements of the main circuit board 82, the laser scanner assembly 86 and the radio 49 into the housing shell 75 spaces the elements tightly, placing the plane of the laser beam and the receiving optics 112 of the laser scanner analog circuit board 105 adjacent a scanning window 131 of the shell 75. The scanning laser beam and its reflection pass through the window in the outgoing and incoming directions, respectively. Spacing the described components at minimum distances adjacent one another as shown in the sectional view of FIG. 5, for example, is made possible by a cutout 132 in the main circuit board 82 to accommodate an upper portion of the laser diode 88. It has been found that the cutout 132 in the main circuit board 82 and hence in its ground plane does not adversely affect RF shielding of emissions from the radio 49. Further in reference to the main circuit board 82 as shown in FIG. 6, the circuit board 82 includes on opposite edges 136 and 137 electrical actuator switches 138. The switches 138 are the electrical components which in conjunction with the external element of the pushbutton 71, typically a molded rubber part, form the pushbutton 71. The external portion of the pushbutton 71 is disposed in the shell 75 to become aligned with the electrical actuator switches 138 when the main circuit board 82 is assembled into the shell 75 as shown in FIG. 5, for example.

Figure 7:
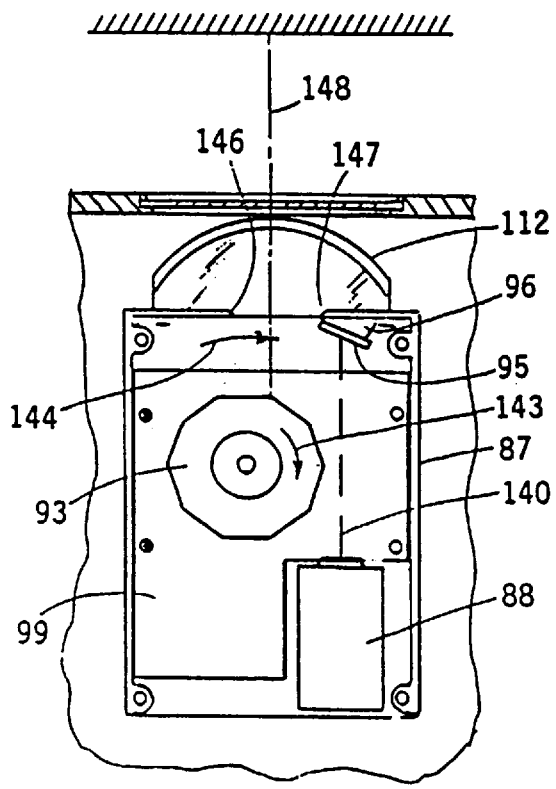
FIG. 7 is a partial plan view of the laser scanner assembly of FIG. 5.

FIG. 7 is a simplified top view of the laser scanner assembly 86 to show the path of the laser beam emitted from the laser diode 88, as shown at 140. The laser beam 140 impinges against the primary reflector mirror 95 and is reflected at 142 against the rotating polygon of preferably ten mirrors 94. The armature 93 rotates during the scanning process in the direction of arrow 143, such that the laser beam reflected from the mirrors 94 scans at 144 in a direction from left to right of an operator holding the data terminal 10. Left and right scanning window edges 146 and 147, respectively, cut off the laser beam to the far left and right and limit the scanning angle to a reasonable deflection from a centerline of the data terminal 10. The optimum scanning angle may be altered by relocating the window edges 146 and 147 accordingly. The laser beam, when reflected from an impinged on surface 149 into the receiving optics 112, would be modulated in accordance to reflection patterns on such reflected surface 149, such as the dark and light alternating regions of a bar code.

Figure 8:
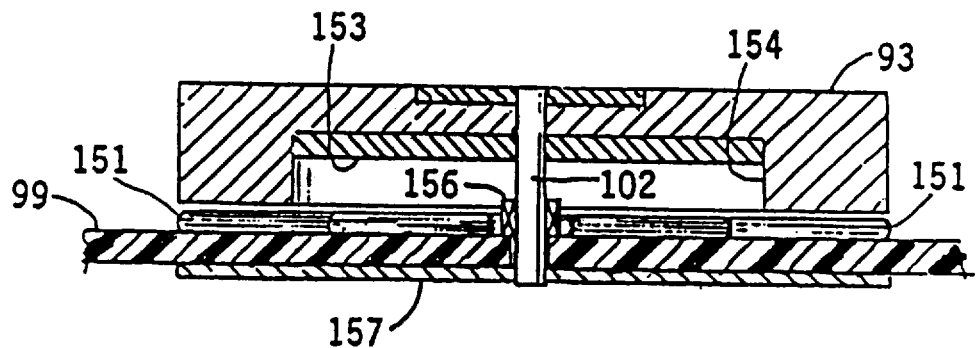
FIG. 8 is a somewhat simplified sectional view of a motor assembly of the laser scanner assembly shown in FIG. 7.

FIG. 8 is a cross sectional view through the stepping motor assembly 98 which is somewhat simplified for the sake of clarity. The motor circuit board 99 supports magnetic field coils 151, of which there may be three equally spaced coils, as in a preferred example. The coils 151 lie in the plane of the motor circuit board 99 and direct a magnetic field substantially perpendicularly thereto out of the plane of the circuit board 99. The coils 151 are electrically coupled to electronic driver elements (not shown) which are preferably also disposed adjacent the coils 151 on the motor circuit board 99. The main body of the armature 93 is of non-magnetic material, such as aluminum. However, a magnetized permanent magnet element 153 is disposed in a central recess 154 of the armature 93. The armature 93 is rotatably supported by the spindle or shaft 102 which may be mounted for rotation in a bearing 156 disposed on the surface of the motor circuit board 99. Alternately, the spindle might be fixedly mounted to extend from the motor circuit board 99, such that the bearing 156 would reside between the spindle and the armature. A circular plate 157 of a magnetically conductive material is disposed below the circuit board 99 to serve as a magnetic flux shunt and provide a magnetic return path for the magnetic flux lines generated by the coils 151.

Figure 9:
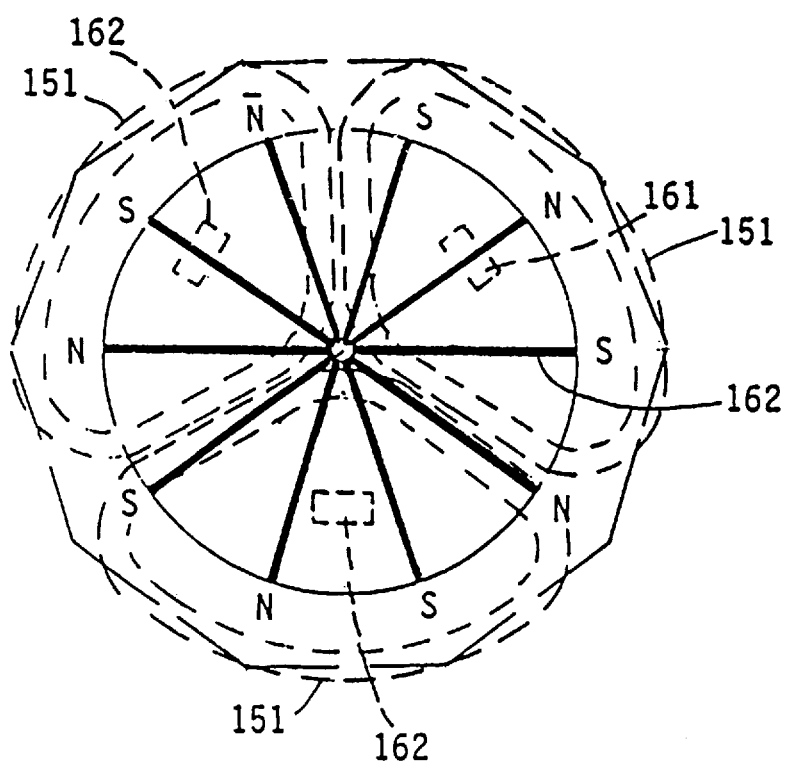
FIG. 9 is a schematic plan view diagram of the motor assembly shown in section in FIG. 8.

FIG. 9 showing a schematic plan view of the armature 93 and the field coils 151. The magnet element 153 of the armature 93 has a plurality of alternately oriented peripherally spaced magnetic polepieces 161 which are in a preferred embodiment part of the single ceramic type magnet disc 153. Within each of the coils 151, there may be located a hall effect sensor device 162. The hall effect sensors 162 detect from the magnetic field the current position of the armature or rotor 93 to control the switching of the drive current through the coils 151. In the stepping motor art there are various known ways of switching coils and of overdriving in accordance with the position of the rotor 93 to achieve a desirable drive pattern of the rotor. In the present embodiment of the invention, a substantially uniform scan rate is of course desirable, though the armature or rotor 93 is driven through the stepping sequence of the motor assembly 98. It should be understood that the use of hall effect devices to determine the position of the armature 93 is but one known manner for controlling the speed of rotation and the position of the armature. It is also possible to use opto-electronic encoding techniques to achieve substantially similar position recognition and to control the speed of rotation of the armature 93. It is to be realized that the flattened structure of the motor assembly 98 resulting from the folding back of the mirrors 94 on the armature 93 is of significance in containing the radio 49 and the laser scanner 50 within the shell 75 of the preferred size as described herein.

Figure 10:
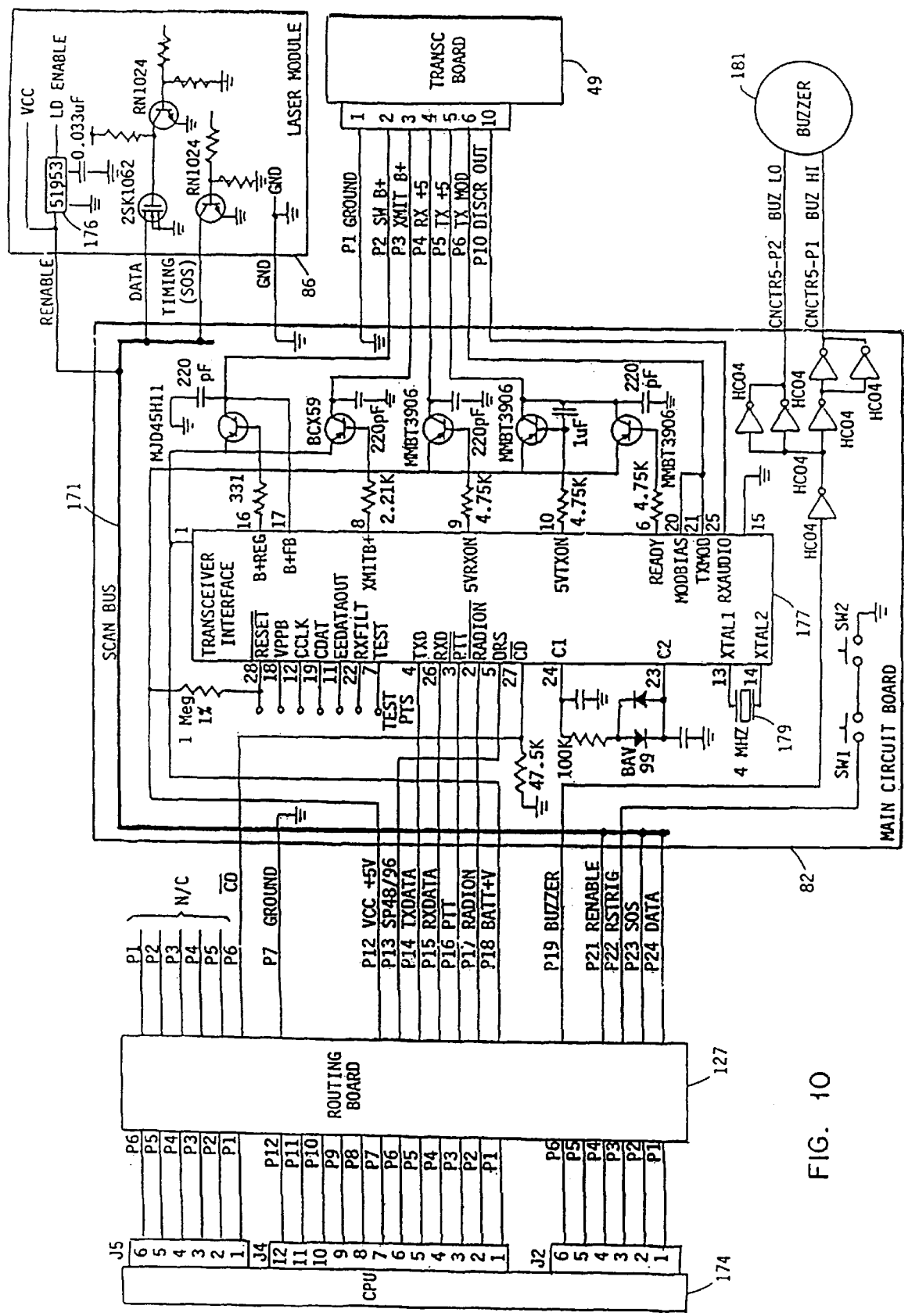
FIG. 10 is a functional schematic diagram showing the manner in which the various elements of the data collection and communications module interact with each other.

Reference to the schematic diagram in FIG. 10 shows major functional elements of the described data collection and communications module 49. The functional representation of the laser scanning assembly 86, referred to in FIG. 10 as laser module 86 is coupled With four connections to a scan bus 171 on the main circuit board 82. The electronic circuits in the laser module for driving the stepping motor and for amplifying reflected signals is a commercially available configuration. In the preferred embodiment, the circuits of the laser module 86 have been obtained from Optoelectronics Co. Ltd. in Japan. Connections for communicating signals between the laser module 86 and a microprocessor (CPU) 174 of the base module 16 include RENABLE, DATA, TIMING (SOS), and ground (GND). RENABLE activates the laser module 86 upon one of the pushbuttons 71 being closed, as represented by SW1 and SW2 on the main circuit board 82. Closing of either of the pushbuttons 71 is recognized by the CPU 174 of the base module 16. The CPU switches the RENABLE connection to a high, which powers up the laser scanner assembly 86. VCC is a typical power input, while the laser diode is driven through a DC to DC converter "51953", identified by numeral 176. When the motor 98 has come to speed the laser diode is turned on, and the laser module d86 sends a signal via TIMING (SOS) to the CPU 174. The TIMING signal frames the data and alerts the CPU that data are forthcoming. Data are transmitted to the CPU via the DATA line and the scan bus 171. It should be noted that the scan bus 171 is coupled via the routing board 127 to the CPU 174 of the base module 15, and all other signal and power lines are simply routed through the routing board 127 between the main circuit board 82 and the base module 16. There is no further manipulation of data or signals between the CPU and the laser module 86 on the main circuit board. On the other hand, the main circuit board 82 performs various functions relating to the control of radio communication between the CPU 174 and the radio or transceiver board 49. It should be noted that not all possible control leads to the radio 49 are connected to the CPU 174 or to the main circuit board 82, though it is conceivable that additional functions may be implemented and connected in variations of the preferred embodiment with respect to which the invention is described. Functions relating in particular to the control of the radio 49 and particularly to the frequency control in digital data transmission are discussed in related U.S. application Ser. No. 07/467,096, filed Jan. 18, 1990, by S. E. Koenck and R. L. Mahany, assigned to the assignee of the present application, now U.S. Pat. No. 5,052,020, the disclosure of which in its entirety is incorporated herein by reference. Thus, as is apparent from FIG. 10, the TRANSCEIVER INTERFACE function represented by a circuit element 177 is a communications interface for between the radio 49 and the CPU 174. The circuit element 177 activates power to the radio 49 and controls transmission and reception signals, such as indicated by TX MOD and DISCR OUT. The circuit element 177 is driven by an on board clock timed by a 4 MHZ crystal 179. A buzzer circuit 181 is amplified using on-board power of the main circuit board 82. It should be realized that not all connections from any commercially available radio 49 and the main circuit board may be used. Various types of radios are known, of which certain radios may function on more than one frequency or a radio type referred to as spread spectrum radio may require various controls. It is contemplated that such radios referred to as spread spectrum radios may be used in conjunction with and as part of the invention described herein. The descriptive matter of U.S. patent application Ser. No. 07/660,615, filed Feb. 15, 1991, by S. E. Koenck et al., the application being assigned to the assignee of the present application, now U.S. Pat. No. 5,218,187, is being incorporated herein by reference. Such patent application refers to advantages of adapting modules to function with different radios. It appears from the above disclosure herein that the present invention may be adapted to function with a number of such different types of radios.

Various other changes and modifications in the structure of the described embodiment are possible without departing from the spirit and scope of the invention as set forth in the claims.

2. Description of FIG. 11

Figure 11:
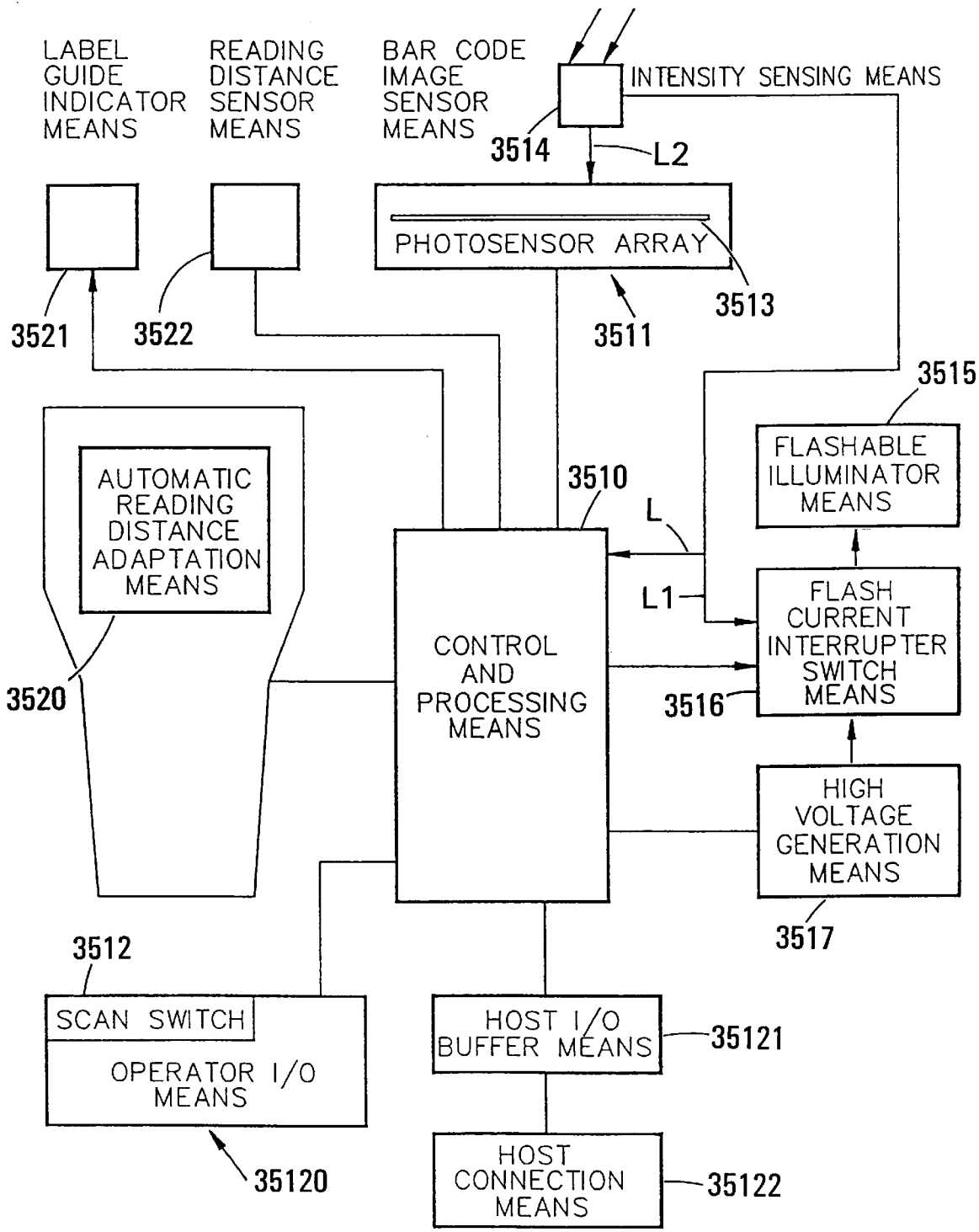
FIG. 11 corresponds with the first figure of incorporated U.S. Pat. No. 4,877,949.

FIG. 11 illustrates a preferred instant bar code reader system for extending the versatility of a commercial bar code reader such as shown in U.S. Pat No. 4,570,057. Component 3510, FIG. 11, may represent a control and processing means for the system and may include a central processing unit, memory units and analog to digital conversion channels.

The central processing unit and associated memory form the main control portion of the system. The other functional blocks of FIG. 11 may be inputs or outputs with respect to the central processing unit.

The central processing unit may be a microprocessor that executes the program to control the operation of the reader.

The microprocessor acts as a microcontroller with the capability of sensing and controlling the functional elements of the bar code reader, and decoding the bar code as supplied from a code image sensor means 3511. Where the reader is coupled on line with a host computer system, (for example by a host connection means in the form of a flexible cable), the decoded bar signal is transmitted to the host under the control of the central processing unit. The microprocessor is capable of static operation with shut-down for power conservation. Wake-up of the processor will occur when an operator actuates a scan switch 3512.

An electrically erasable read only memory of component 3510 may be utilized to store parameters and special modifiable decoding sequences for the bar code reader operation. Examples of these parameters would be label code, and input/output speed and control format.

Component 3510 may also include a random access memory for data collection, decoding work space and buffer storage of the decoded label data for transmission to a host computer, for example. The random access memory can be internal to the microprocessor chip or reside on a data bus.

The analog/digital channels are for receiving the bar code signals generated by the bar code image sensor mean 3511 and for other purposes as will be hereafter explained.

The image sensor means 3511 may, for example, include a photosensor array indicated diagrammatically at 3513 having a one dimensional linear array of photodiodes for detecting the bar code reflection image. To read labels with bar code lengths of greater than seven inches with high resolution requires that the array have relatively high resolution. By way of example, the array 3513 may comprise five thousand photodiode circuits (5,000 pixels) and provide approximately three photodiode circuits (3 pixels) for each five mils (0.005 inch) of a bar code length. (Each pixel of array 3513 may have a length of about seven microns.) A charge coupled device (CCD) shift register may be arranged to receive bar code signal elements from the respective photodiode circuits after a suitable integration interval. Once the bar code signal elements have been transferred to the shift register, the signal elements are retained independently of further exposure of the photodiodes to reflected light from the bar code.

In the embodiment of FIG. 11, an intensity sensor 3514 is provided and may comprise a photodiode that will determine the relative amount of light exposure of the photosensor array 3513. If component 3510 operates at sufficiently high speed, the signal from the intensity sensor 3514 may be supplied exclusively to component 3510 via an analog/digital channel so that the control and processing means can determine the optimum point for transfer of the bar code image signals to the shift register.

In a presently preferred implementation, however, the intensity sensor means 3514 is directly coupled with the hardware control circuits of the flashable illuminator means and of the bar code image sensor means, and this is indicated by dash lines L1 and L2 in FIG. 11; in this case, line L is used only so that the processor component 3510 is advised that a flash has actually occurred. In a preferred embodiment wherein a flashable illuminator 3515 is driven by capacitor discharge current, a component 3516 may effect interruption of the flow of current from the capacitor based directly on the signal supplied via L1 from intensity sensor 3514. In this way, energy is conserved, and recharging of the capacitor speeded up. Component 3516 may comprise a flash current interrupter switch means, e.g. a solid state switch which is controlled to interrupt discharge of the capacitor of high voltage generation unit 3517 and thus to terminate the flash of light from the flashable illuminator 3515 when intensity sensor 3514 indicates that adequate reflected light has been received from a bar code.

FIG. 11 also indicates an input/output buffer component 35121 for coupling the control and processing means 3510 with a host processor or the like. A connection means 35122 may directly receive a host processor so that the host processor housing is physically attached with the reader housing. As another example, connection means 35122 may comprise a cable containing six conductors. Preferably, such a cable would be detachable at the reader. In this second example, all needed voltages may be generated in the reader from plus five volts supplied by two of the six conductors (+5 V, GND). The other four signal lines of the cable are preferably independently programmable as inputs or outputs. By way of example, the host processor may be part of a held computer such as shown in U.S. Pat. Nos. 4,455,523 and 4,553,081. The rechargeable batteries of the portable computer may supply all needed power to the reader unit of the present invention. In the second example, a host computer unit can be carried in a belt holster for example during extended use of the reader unit of the present invention.

3. Description of FIGS. 12, 13A, 13B, and 13C

Figure 12:
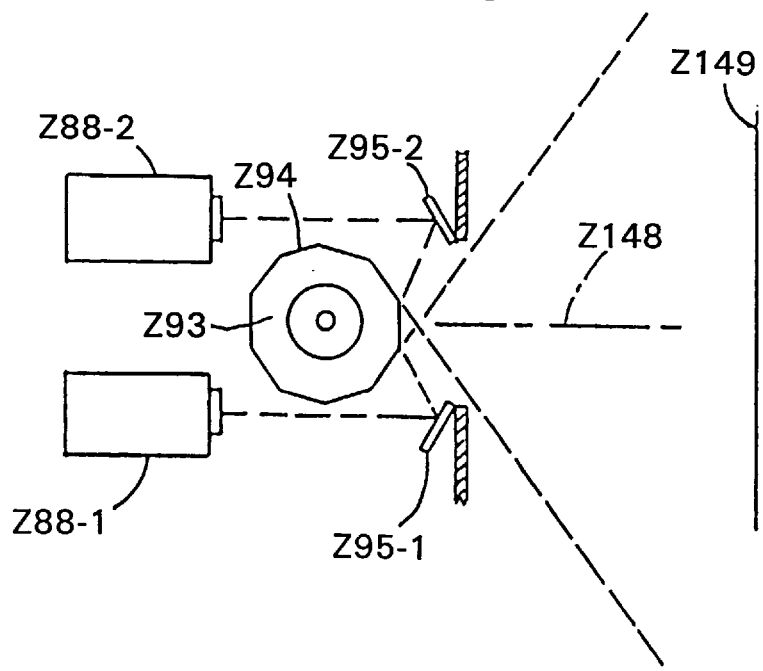
FIG. 12 is a partial plan view of a laser scanner.

FIG. 12 is a view similar to FIG. 7 of U.S. application Ser. No. 07/881,096 (filed May 11, 1992, now abandoned), but showing the use of two laser diode sources Z88-1 and Z88-2. FIG. 12 is generated by shifting parts 88, 93, and 95 in FIG. 7 of U.S. application Ser. No. 07/881,096 (filed May 11, 1992, now abandoned) to the right so that the center of rotation of rotor Z93 coincides with axis Z148 lying centrally of reader window Z131. Then parts Z88-1 and Z95-1 as so located relative to central axis Z148, are replicated to the left of axis Z148 as parts Z88-2 and Z95-2. The frame 87 (as illustrated in the sixth figure of U.S. application Ser. No. 07/881,096, filed May 11, 1992, now abandoned) is now constructed symmetrically to accommodate the two laser diode sources Z88-1 and Z88-2.

Figure 13A:
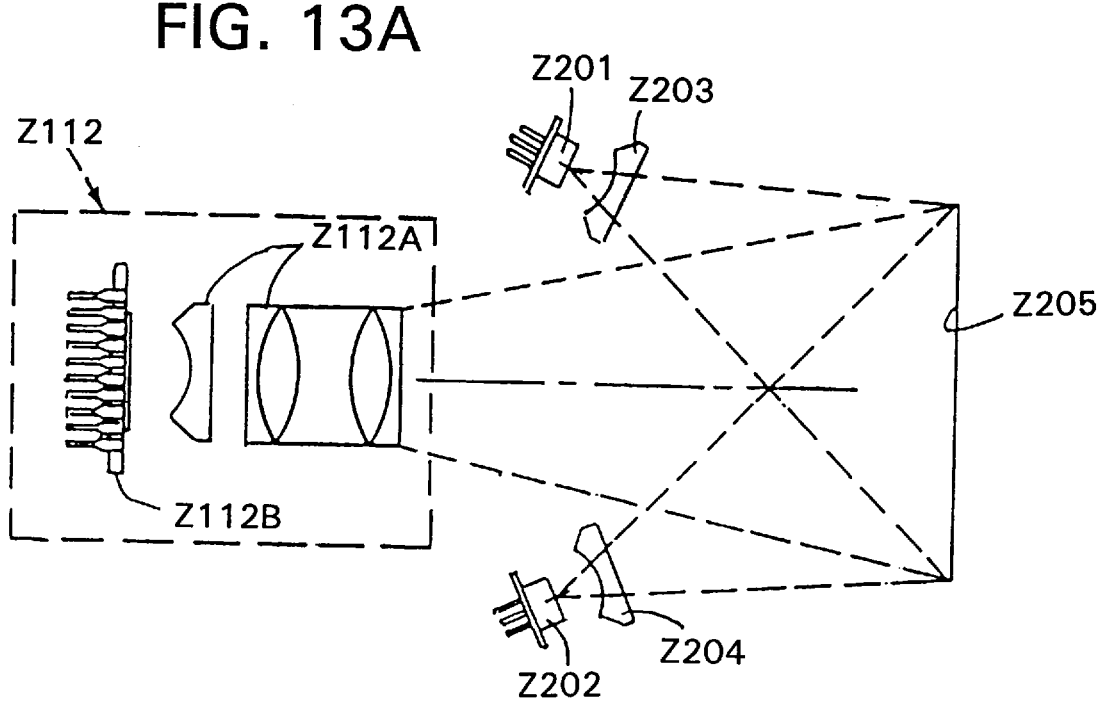
FIG. 13A shows an image sensor system utilizing a laser line type beam generator and an image focusing and sensing system for reading a reflected bar code image.

FIG. 13A shows the use of two line type laser sources Z201, Z203, and Z202, Z204, each illuminating a total field of view Z205 in common, in which case moving parts such as rotor Z93 are entirely eliminated. The image sensor array and optics system 112 (as illustrated by the fifth figure of U.S. application Ser. No. 07/881,096, filed May 11, 1992, now abandoned) 12, including optics 112A and image type photosensor array 112B, e.g., a CCD image sensor array, is located within the dimension E, (as illustrated by the second figure of U.S. application Ser. No. 07/881,096, filed May 11, 1992, now abandoned), below motor circuit board 99 for the embodiments illustrated by figures one through ten and eleven in U.S. application Ser. No. 07/881,096, filed May 11, 1992, now abandoned.

Figure 13B:
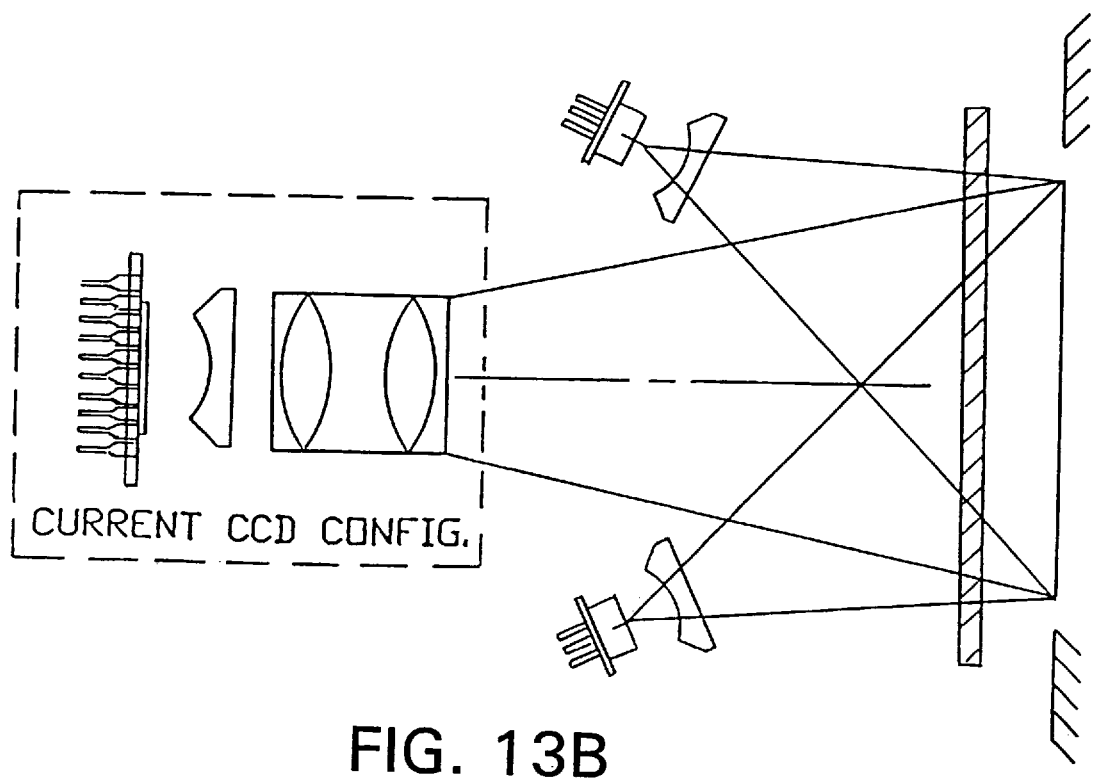
FIG. 13B shows a non-scanning laser illuminated bar code scanner for reading a reflected bar code image.
Figure 13C:
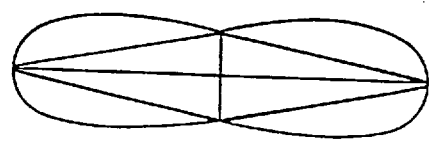
FIG. 13C shows the cross sectional shape of the beams produced by the laser sources of FIG. 13B.

FIG. 13B shows certain components of a non-scanning laser illuminated bar code scanner wherein two solid state laser sources Z1201, Z1203 and Z1202, Z1204 are placed off axis from the centerline of the CCD optical path. The sensing device does not require a folded light path. Since mirrors are not required sensitivity is increased up to five percent per optical interface removed. The half power radiation line for the solid state laser sources (Z1201, Z1203 and Z1202, Z1204), after passing through the dispersive optics (Z1203, Z1204) normally have an elliptical cross-sectional shape. When the ellipse is altered by non-axisymmetric propagation it is fanned out into a distorted pattern which no longer fully resembles an ellipse (FIG. 13C). This may be corrected by using two laser sources with outputs which overlap a target bar code. Such a configuration acts to partially compensate for this pattern distortion. Further compensation may be achieved by utilizing a flash A/D converter and applying conventional digital high pass filtering techniques on the converted data to eliminate the residual effect on uneven illumination. The two laser sources are preferably high powered devices which are pulsed rather than used on a continuous basis. This provides intense illumination for a brief period of time. In such an embodiment the high voltages required by a Xenon flash are not necessary.

For the embodiment of FIGS. 13A and 13B, the mounting frame Z87 and the motor circuit board Z99 may be omitted, and the image reader circuitry associated with system Z112 and laser diodes Z201, Z202 may be placed at side Z84 of the main circuit board Z82. The laser sources Z201 and Z202 may be accommodated by cutouts such as 132 (as illustrated by the sixth figure of U.S. application Ser. No. 07/881,096, filed May 11, 1992, now abandoned) to minimize any required extra thickness E, (see FIG. 2 of 07/881,096), of the image reader/RF module containing the components Z112 and Z201–Z204 of FIGS. 13A and 13B.

4. Description of FIGS. 16–18B

FIGS. 16–18B illustrate an image reader/RF module for assembly with the base module 16 (as illustrated in FIGS. 1 through 10 of 07/881,096), and which may be readily modified to form the system of FIG. 13A with no moving parts.

FIGS. 16–18B show an image reader/RF module Z210 which is interchangeable with module 48 (of the fourth figure of 07/881,096) and Module 51 (of the third figure of 07/881,096) with respect to base module 16. A terminal housing including base module housing 14 and module shell 214 has the overall dimensions A, B, D and Cl as given with reference to the first and second figures of 07/881,096 (i.e. A is about seven inches, e.g. 6.875 inches or 17.46 centimeters; B is about two and three-fourths inches, e.g., 2.625 inches or 6.68 centimeters; D is about one and one-half inches, e.g. 1.25 inches 3.18 centimeters; and Cl is about two inches or about five centimeters). The image reader module Z210 is provided with an edge face Z214A (FIG. 18B), mating with edge faces such as 52 and 53 of the base module 16 in the same way as described for the module 48 of the second figure of 07/881,096. A downwardly protruding wall portion Z214B advantageously provides a gripping margin for the index finger of a user of the data terminal providing secure support for the terminal even in the absence of a hand strap such as 68 (as illustrated in the third figure of 07/881, 096).

The module Z210 is shown as being provided with latch hooks Z216 (FIG. 18A), for interengaging with respective latch seats 57 (FIG. 4 of 07/881,096), as with modules 48 and 51. Module Z210 is also equipped with a stop edge Z214C, (FIG. 18A), with a recess Z217 for interlocking with a projection Z218 of the seat 67, (FIG. 4 of 07/881,096), as the module Z210 is moved longitudinally into its final position. Threaded seats are indicated at Z219, (FIG. 18B), for receiving screws 63, (FIG. 4 of 07/881,096), so as to fasten module Z210 as a fixed part of the data terminal.

During longitudinal movement of module Z210 into its final assembled position, the pins of connector Z222 interengage with the receiving connector 62, (FIG. 4 of 07/881, 096). The relative longitudinal positions of latch parts (216, 57) assure that the pins of connector Z222 are moved upwardly to a position just in front of and aligned with connector 62 before the longitudinal movement can begin. The levels of mating edges (53, 214D) of the base module 16 and of the module Z210 assure that the pins of connector Z222 must be at the proper level during longitudinal movement as permitted by the interfitting configurations of latch parts (Z216, 57).

Figure 16:
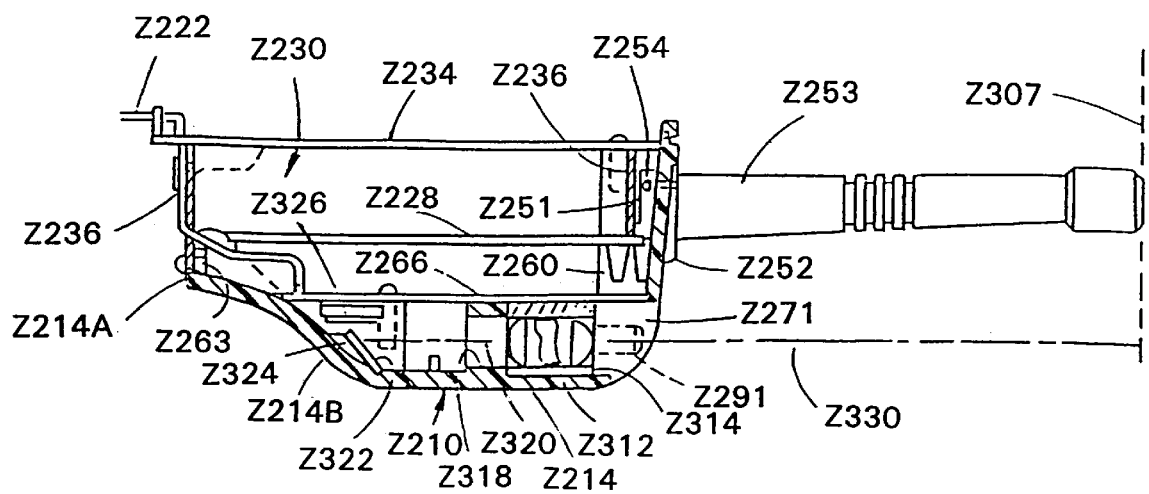
FIG. 16 shows an image reader module which may optionally use the image sensor system of FIG. 13A.

In the implementation of image scan/RF module Z210 shown in FIG. 16, a main analog board Z228 underlies a radio subassembly Z230 including an RF board Z234. The main analog board Z228 essentially corresponds with main analog board 82, and the RF board Z234 is essentially the same as RF board 122 of the previous embodiment. An open rectangular metal shielding frame Z236 surrounds the RF components. The RF board Z234 may in itself contain RF shielding toward its upper surface, or separate shielding such as an additional board having a ground plane may be provided immediately above the RF board Z234 as shown at 123, (FIG. 6 of 07/881,096).

In an embodiment where the RF transmitter is not active at the same time as the scanner subassembly, no special RF shielding was included with the RF board Z234.

In a specific implementation, the shielding frame Z236 is provided with projecting tabs which are inserted into receiving slots of the analog board Z228 and soldered in place so as to be directly electrically connected with the inner ground plane of the analog board Z228 (in the same way as for tongues 116 and apertures 117 of the sixth figure of 07/881, 096).

Figure 17:
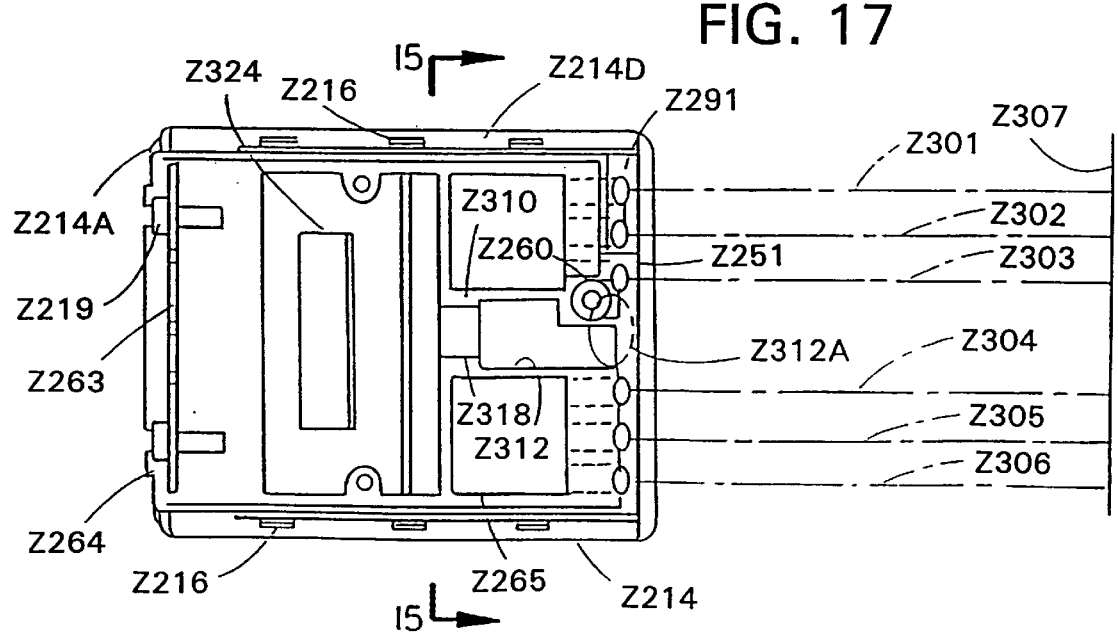
FIG. 17 is a plan view of the module case of the embodiment of FIG. 16, and illustrates an LED illumination system.
Figure 18A:
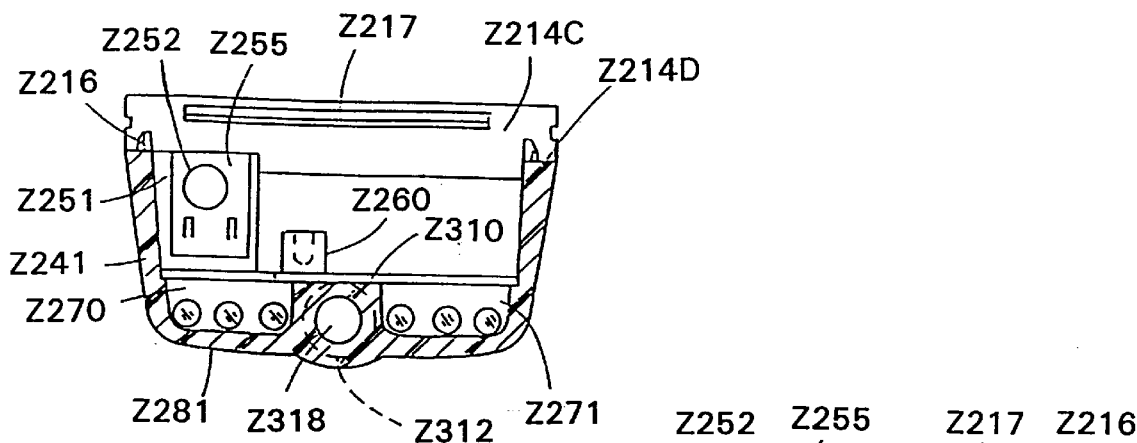
FIG. 18A is a cross sectional view of the module case taken generally along the line 15—15 of FIG. 17.
Figure 18B:
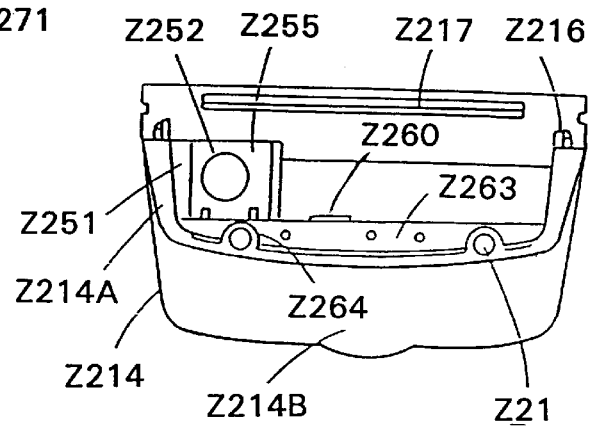
FIG. 18B is an end elevational view of the module case of FIG. 17.

FIG. 18A shows a cross section of the module shell Z214 taken along line 15—15 of FIG. 17. This Figure shows integral rib means Z251 which also appears in FIGS. 16 and 17, and which adjoins a through-aperture Z252 accommodating the threaded end of antenna Z253. A thin metal plate Z254 fits into the space Z255 and is captured therein and prevented from rotation when the antenna is threadedly engaged therewith.

A boss Z260, FIG. 18A, integral with the shell 214 has a threaded insert for use in securing the RF assembly Z230 to the shell. A transverse rib Z263, (FIG. 18B), extends near edge face Z214A and bosses Z264 for receiving threaded seats Z219.

Referring to FIG. 18A, the shell Z214 has thickened end wall portions Z270 and Z271 with respective sets of cylindrical bores Z281 for receiving respective light emitting diode units such as Z291, (FIG. 16), for directing illuminating beams along respective beam axes Z301–Z306, (FIG. 17), toward an image plane Z307.

Centrally of the shell frontal wall there is an inwardly extending boss Z310 having a cylindrical chamber Z312 which opens through the front wall and accommodates insertion from the exterior of an optics subassembly such as diagrammatically indicated at Z314, FIG. 16. The optics Z314 collects reflected light from a bar code or the like at the image plane Z307 via an entrance portion which communicates with optics chamber Z312 and which is diagrammatically indicated at Z312A in FIG. 17. A reduced diameter aperture Z318 of boss Z310 accommodates the passage of the focused reflected image along an axis Z320. A reflecting mirror Z322 secured at a seat Z324 formed by shell Z214 redirects the reflected bar code image to an image sensor Z326 which is mechanically and electrically connected to the image reader board Z266.

In the exemplary embodiment, the optics Z314 focuses a bar code image onto image sensor Z326 for positions of the bar code along optical axis Z330, (FIG. 16), which are beyond the end of the antenna Z253. In this way a simple optical arrangement can be utilized, even an optical arrangement with minimal depth of field of approximately one inch.

In the exemplary embodiment, the lens system Z314 was from a commercial CCD reader of Norand Corporation which utilized a folded optical path generally as shown in U.S. Pat. No. 4,894,523 issued Jan. 16, 1990. It was possible to eliminate two reflectory mirrors of the folded optical path by placing the bar code sensing region beyond the antenna.

In the exemplary implementation it was found that a substantially more uniform illumination of a bar code could be obtained at an operating range beyond a three inch antenna by adjusting the axes Z301–Z306 somewhat in comparison to directions parallel to the optical axis Z330 as indicated in FIG. 16, such that the axes Z301–Z306 of the beams intersect the image plane Z307 at uniformly spaced points.

5. Description of FIGS. 14 and 15

Figure 14:
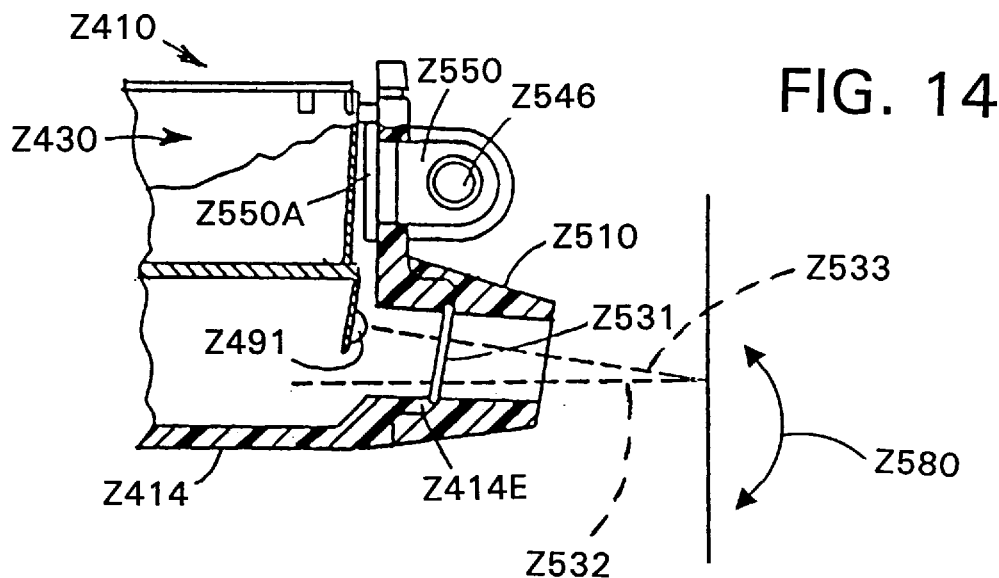
FIG. 14 is a partial longitudinal sectional view of an image reader module similar to that of FIG. 16, but incorporating a transversely disposed antenna and a different optical port construction.
Figure 15:
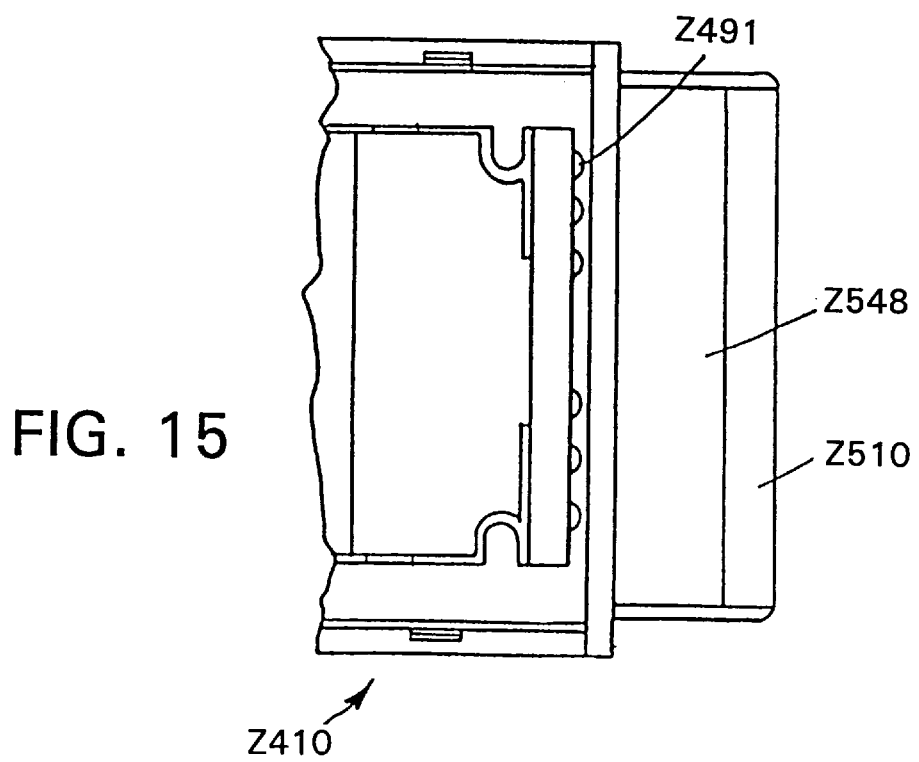
FIG. 15 is a partial plan view of the module of FIG. 14.

FIGS. 14–15 illustrate a further image reader/RF module for assembly with the base module 16 of the first through tenth figures of 07/881,096, and which may be readily incorporate the laser reader system of FIG. 13A with no moving parts.

FIGS. 14 and 15 show the further image reader/RF module Z410 which is interchangeable with modules 48, 51, and 210. Elements Z414, Z414A, Z414B, Z414C, Z414D, Z416, Z417, Z422, Z428, Z430, Z434, Z436, and Z491 of FIGS. 14 and 15 substantially conform with elements Z214, Z214A, Z214B, Z214C, Z214D, Z216, Z217, Z222, Z228, Z230, Z234, Z236 and Z291 of FIGS. 16–18B, so that the description of these elements will be understood by reference to the description of FIGS. 16–18B.

As seen in FIG. 14, housing Z414 is provided with an outwardly protruding seat; Z414E which receives a snap-on cowl piece Z510 which serves to retain an optical window Z531 covering an elongated generally rectangular opening at the front housing Z414.

As shown in FIGS. 14 and 15, the module Z410 has a transverse extending antenna Z546 housed within a dielectric cover Z548 completely within the confines of the length of housing Z14 with cowl Z510, and within the width dimension of housing Z14. The antenna may be a helical wound wire type, and may be carried by a fitting Z510 having an enlarged base Z550A for coupling with the RF circuits Z430.

6. Description of FIGS. 19–22

FIGS. 19–22 show a reflected image reader submodule which may be used in any of the embodiments disclosed in U.S. application Ser. No. 07/881,096 such as those of the first through eleventh and the thirteenth through eighteenth figures of Ser. No. 07/881,096, and the foregoing embodiments taken with FIG. 13A. Coplanar solid state light sources, including laser diodes Z210, Z202, and cylindrical lenses Z203, Z204, similar to those shown in FIG. 13A may also be included with submodule Z600, for example at Z601, Z602 outside the margins Z603, Z604 of the collecting zone for the reflected light image, or the submodule may operate from ambient light, or from light from an auxiliary spot-light like the light source on a vehicle and separate from the hand-held bar code reader of any of FIGS. 1–18 of 07/881, 096, equipped with the submodule 600.

In the submodule Z600, the reflected image impinges on a reflecting mirror surface Z610A of a segmental spherical aluminum mirror Z610 whose height corresponds to the height of module Z600 and may correspond generally with height E, (FIG. 2 of 07/881,096). Mirror Z610A reflects the incident image to a surface mirror region Z620A of a cover glass Z620. The image is again reflected and is then focused by lens assembly Z630 onto an photodetector image array Z640. A linear actuator Z650, FIG. 20, may be coupled with the lens assembly Z630 and control the axial position thereof for optimum focus of the information image onto array Z640, e.g., as in referenced U.S. Pat. No. 4,877,949, issued Oct. 31, 1989.

Figure 19:
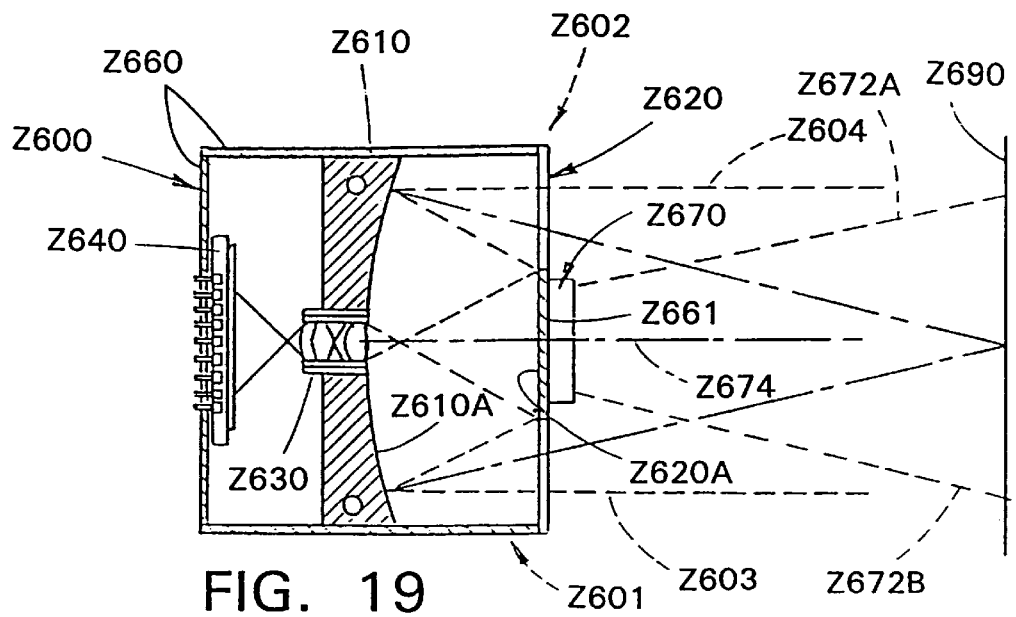
FIG. 19 is a somewhat diagrammatic horizontal sectional view showing a different image reader system for incorporation in the reader modules herein disclosed.
Figure 20:
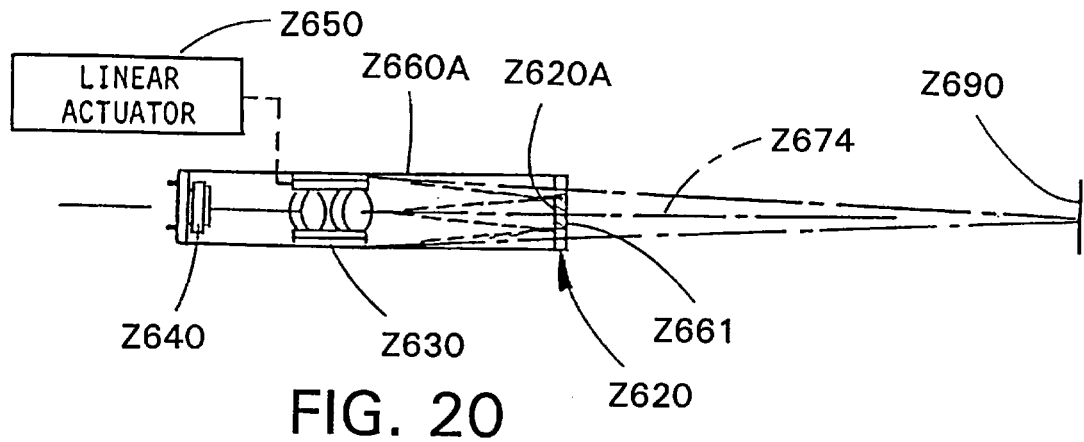
FIG. 20 is a diagrammatic longitudinal sectional view of the system of FIG. 19.
Figure 21:
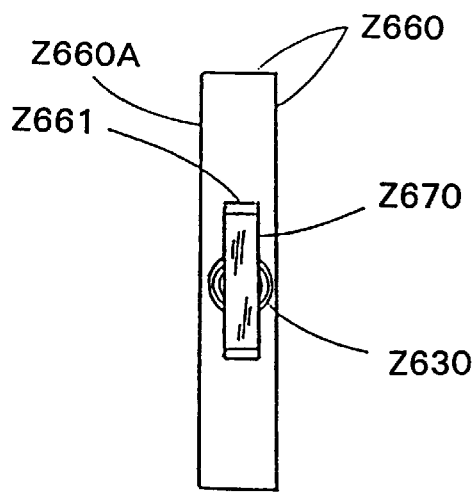
FIG. 21 is a front view of the system of FIG. 19.

The aluminum spherical mirror Z610 may function not only as an optical element, but also as a structural element for supporting the lens assembly Z630 and autofocus linear actuator Z650. The use of large mirror surface Z610A as seen in FIG. 19 allows the size of the subsequent optical string to be reduced since the lenses Z630 (an achromatic doublet has been indicated) are not relied upon as the principal light gathering structure.

Figure 22:
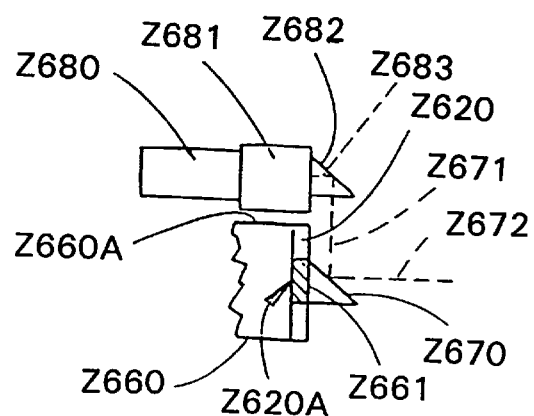
FIG. 22 is a diagrammatic illustration of the manner of applying a fan type laser line generator to the system of FIGS. 19, 20 and 21.

A preferred approach to integrating a fan beam generator with the photodetector submodule Z600 is illustrated in FIG. 22.

In FIG. 22, the housing of the module Z600 is shown with light proof walls Z660 and with the window Z620 opaque at Z661 in front of mirror surface Z620A. Then a mirror surface is provided at Z670 for transmitting a vertically incident fan-shaped laser beam Z671 into a fan beam plane at Z672 which is coplanar with the optical axis Z674, (FIG. 19).

FIG. 22 shows a laser diode source Z680, spreading optics Z681 and a right angle prism or mirror surface Z682 for redirecting a horizontal fan-shaped laser beam at Z683, these components Z680–Z682 being carried at a top wall Z660A of submodule Z600.

The configuration of the fan beam with central axis Z672 is indicated by marginal rays Z672A and Z672B in FIG. 19, and an exemplary image plane is indicated at Z690 for a given axial position of optics Z630.

7. Discussion of FIGS. 12–18B

In housing a photosensor image array such as a CCD linear multi-element array for component 112, (FIG. 5 of 07/881,096), the integration time of the sensor array is synchronized to the scan rate of the laser beam (FIG. 7 of 07/881,096) or laser beams (FIG. 12) so that each pixel of the array would receive an equal amount of light with the beam scanning a uniformly reflecting surface. In reading a bar code, after one or more complete scans of the bar code by the laser beam, the image data is read out of the array such that each pixel of the array is coupled with the laser beam or beams an equal number of times before read out, i.e., receives an equal number of exposures to reflected light from the laser beam or beams.

The problem of synchronization does not arise when a laser line projector or laser line projectors, as in FIG. 13A, simultaneously illuminate all elements of the bar code. The illuminated complete bar code is then imaged at all of the elements of the sensor array at the same time, so that the integration time can be selected solely from the standpoint of formation of an optimum output signal from the image array.

In FIG. 13A, the output from each laser diode has a beam cross section which is of an elongated elliptical configuration. The semi-major axis of the beam cross section is oriented so that as it strikes the respective cylindrical lens Z203, Z204, the elongated nature of the cross section is enhanced and it spreads out to a length preferably to cover a complete line of a bar code. If some collimation is provided in the plane of the semi-minor axis, then the elliptical cross section becomes an approximation of a line.

It will be understood that the line type solid state laser light sources Z201, Z203, Z202, Z204 of FIG. 13A are readily substituted for the LED arrays 291 (FIG. 14 of 07/881,096) or Z491, FIGS. 14–15.

In an embodiment according to FIGS. 16–18B, the light sources Z201, Z203; Z202, Z204 would be generally in the horizontal plane of the central reflected light ray Z330 and at opposite sides of the reflected image receiving aperture Z312A, FIG. 17, to provide a coplanar light source/image receiver arrangement.

In an embodiment according to FIGS. 16–18B if the solid state light sources Z201, Z203; Z202, Z204 FIG. 13A were positioned above the horizontal plane of the central reflected ray Z532, and were directed somewhat downwardly as represented by ray Z533, FIG. 14, and if the angle of the sloping plane of rays Z533 was not adjustable as represented by double headed arrow Z580, this non-coplanar arrangement would limit the depth of effective illumination since it is intended that the laser beams have a relatively narrow effective thickness dimension in comparison to that provided by the LED arrays Z291 and Z491. Thus a useful modification of FIGS. 14, 15, 19, and 20 for increased illumination depth would be to place solid state laser light sources Z201, Z203; Z202, Z204, (FIG. 13A), coplanar with the horizontal plane of central reflected ray Z532, (FIG. 14). This is readily accomplished as can be seen from FIG. 15.

7. Description of FIGS. 23–26

Figure 23:
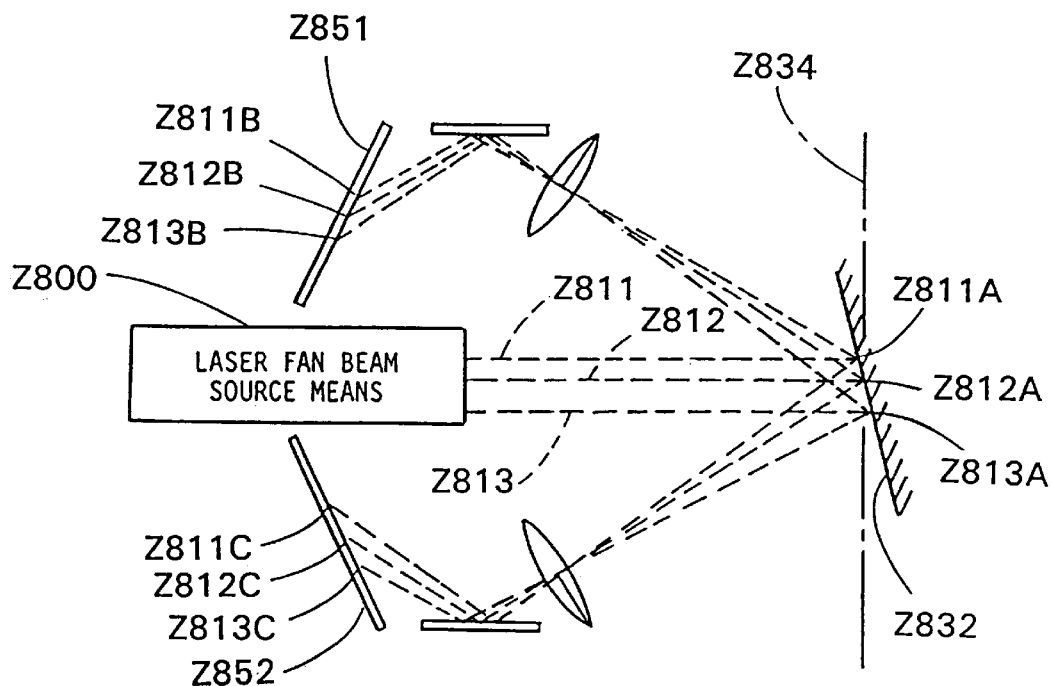
FIG. 23 is a diagrammatic illustration of a range and angle measurement system.
Figure 24:
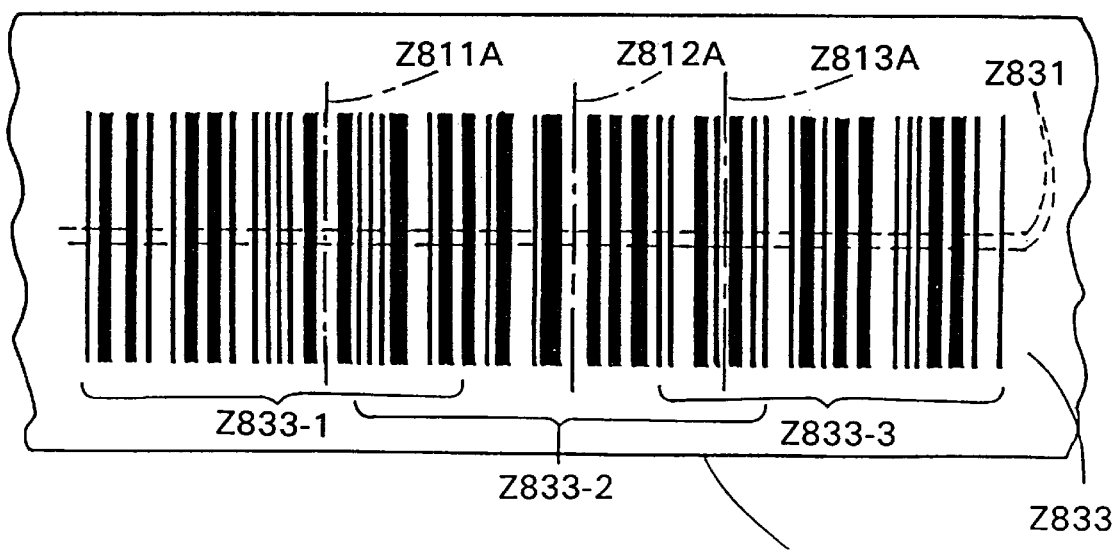
FIG. 24 is front elevational view of a conventional horizontally disposed bar code illustrating the impingement of a fan beam illuminating a bar code.

FIG. 23 illustrates a range and angle measurement system based on U.S. Pat. No. 4,373,804, the first figure. In the present embodiment, laser light source means Z800 may comprise laser diode means Z801, FIG. 26, spreading optic means Z802 and selector means Z803, Z804 for selectively providing a vertically oriented fan beam or a horizontally oriented fan beam. Further beam divider means Z805–Z810, FIG. 26, of source means Z800 may serve to generate three vertically oriented fan beams such as indicated at Z811, Z812, Z813 or a single horizontally disposed fan beam such as indicated at Z831, FIG. 24, at bar code label Z832.

Where the three vertically oriented fan beams Z811, Z812, Z813 are directed toward a horizontally disposed bar code Z833, FIG. 24, they may impinge on the bar code as vertical lines with axes Z811A, Z812A, Z813A distributed over a substantial portion of the bar code length so as to adequately sample any skew of the label Z832 relative to a normal axis Z834, FIG. 23. Range measurements at Z811A, Z812A, Z813A, for example, will differ as indicated by the displacements of point Z811A and Z813A from normal axis Z834 in FIG. 23. Where beams Z811, Z812, Z813 diverge so as to intersect bar code Z833 at respective generally equal segments, and the range measurements to points Z811A, Z812A, Z813A, FIG. 23, differ substantially, linear actuator Z650, FIG. 20, could be set in succession to the three measured ranges for reading the respective bar code segments Z833-1, Z833-2, and Z833-3, whereupon these three segments could be combined to obtain a complete bar code reading. Processing procedures for joining partial bar code readings are known in the art.

Figure 26:
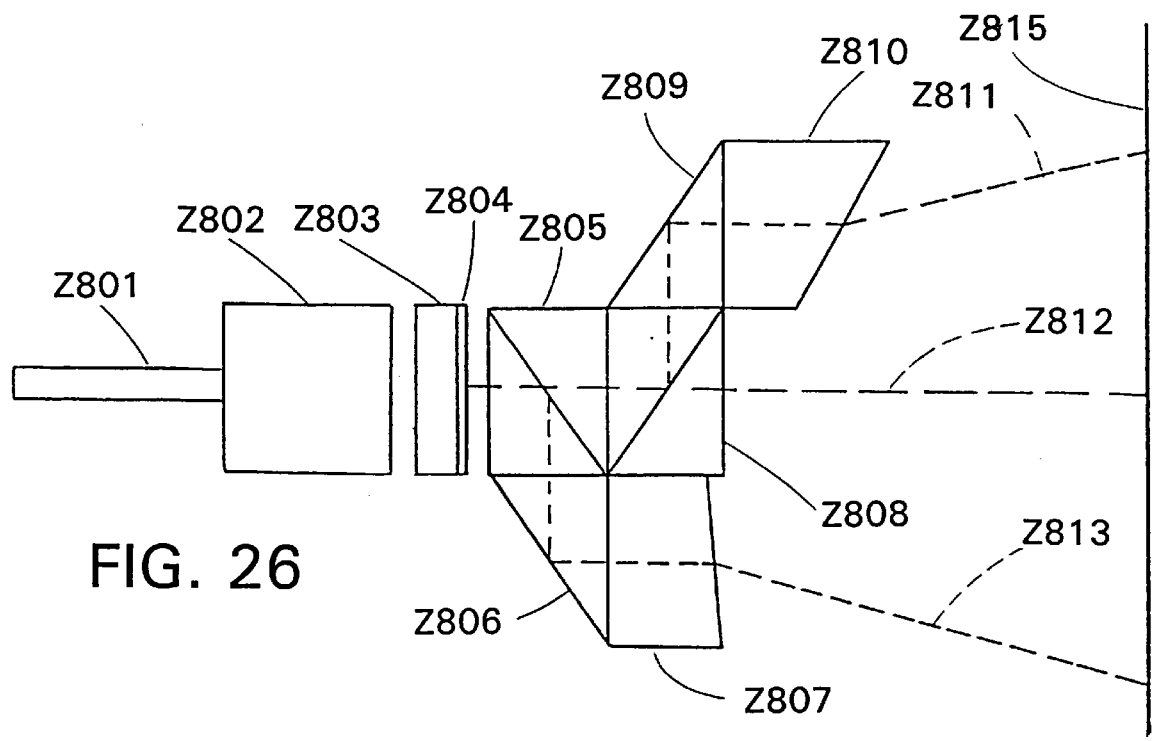
FIG. 26 is a diagrammatic illustration of the vertically and horizontally adjustable fan beam selector of FIG. 25 providing a fan beam output.
Figure 25:
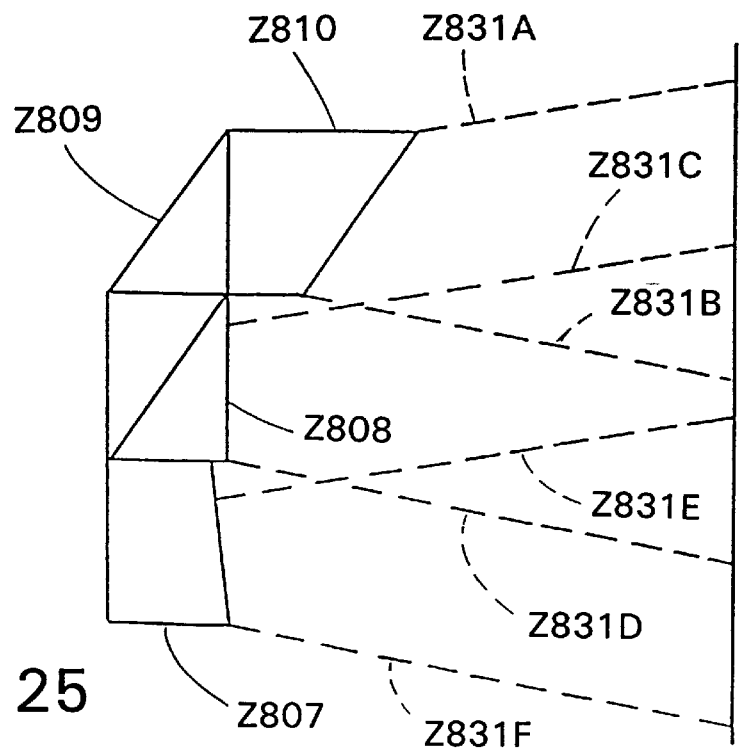
FIG. 25 is a diagrammatic illustration of a vertically and horizontally adjustable fan beam selector.

If it is desired to use crossed fan beams generated by a common laser diode source Z801, FIG. 25, then an analyzer plate Z804, FIG. 26, may be provided for transmitting only a horizontally polarized fan beam Z831, but blocking a vertically polarized fan beam. An LCD cell Z803 when energized may rotate the polarization of the input crossed fan beam such that beam Z831 is blocked and cross hair type fan beams Z811, Z812, Z813 are produced.

In this case, LCD cell Z803 is energized to provide the range and slope measurement mode of FIG. 23, and thereafter the LCD cell Z803 is de-energized to permit a bar code reading.

With the LCD cell 803 de-energized, the vertically disposed fan beam is intercepted at Z804, and the horizontally disposed fan beam with horizontally polarized light is transmitted by analyzer plate Z804 to the prism or mirror type beam splitter Z805–Z810 which spreads an incident fan beam disposed in the horizontal plane of FIG. 24 to cover a bar code such as indicated at Z833, FIG. 24. The constituent beams making up the overall beam Z831 are indicated by marginal rays Z831A, Z831B, Z831C, Z831D, Z831E, Z831F in FIG. 25.

Two laser diodes at Z801 with junction planes at right angles can supply the respective fan beams, using spreading optics such as Z203, Z204 for component Z802, FIG. 26.

The photodetector arrays such as Z851, Z852, FIG. 23, could be of the two dimensional matrix type, for example, so as to both sense the variable positions of the incident cross hair beams at Z811B, Z812B, Z813B, Z811C, Z812C, Z813C and to sense the spacial modulation of the reflected light beam Z831 due to bar code Z833. However, a linear CCD would most likely sense the bright spots at the code in most cases.

Description of FIGS. 27–33

Figure 27:
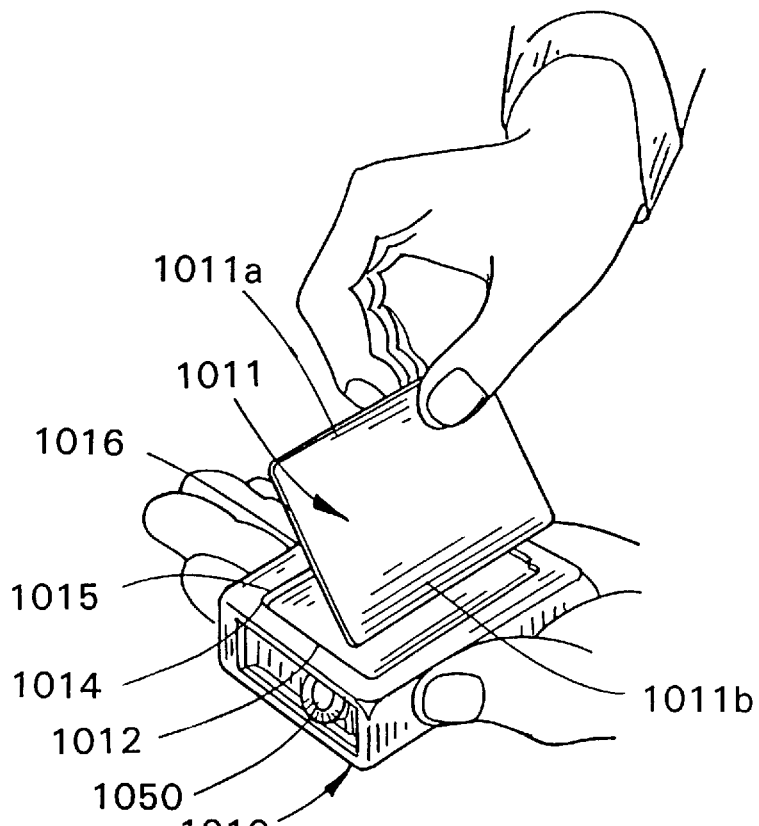
FIG. 27 is a somewhat diagrammatic perspective view illustrating the insertion of an intelligent information card into a receptacle of a terminal means in accordance with the present invention while the terminal means is held by one hand.

FIG. 27 is a perspective view illustrating a preferred terminal configuration 1010 of a size to be held in the hand of the user. FIG. 27 illustrates the placing of an information card 1011 into a receptacle 1012 of the terminal. The card 1011 may be a standard intelligent information card conforming with international standards such as the present ISO standard. Such a card may have the same length and width and thickness as a standard credit card now in use. By way of example, such a card may have an array of eight contact terminals at one side thereof providing for interface with other devices. Such a card may have an electrically erasable programmable read only memory of a sufficient capacity to record an individual's account number, personal identification number and other information which may be desired for reliably identifying the individual. Further, such a memory may have a capacity for receiving extensive additional information such as might be required in effecting betting on a number of horse races.

By way of example, receptacle 1012 may be provided with nub means 1014 which is configured to cause the card 1011 to flex at its edge 1011a as it is pivoted into receptacle 1012. Thus the nub means 1014 may be spaced above the floor of the receptacle 1012 by a distance slightly greater than the thickness of the card. An opposite side edge 1011b of card 1011 may be inserted under similar nub means at the opposite side of receptacle 1012 and the card 1011 then pivoted downwardly until edge 1011a of the card is snapped under nub means 1014. The nub means at opposite sides of receptacle 1012 which cooperate with card edges 1011a and 1011b hold the card 1011 in receptacle 1012, and spring urged contacts in the floor of receptacle 1012 make pressure engagement with the array of eight contacts on the underside of the card, once the card has been inserted.

Any suitable means may be employed to facilitate removal of a card from the receptacle 1012. For example, a wall 1015 of terminal 1010 may be provided with a notch 1016 enabling insertion of a fingernail or stylus under edge 1011a of the card for prying the card upwardly and out of the recess. The standard card 1011 is sufficiently flexible so that this is readily accomplished.

In the embodiment of FIG. 27, a touch screen 1017 occupies the side of the terminal opposite receptacle 1012 and has an area generally comparable to the area of the standard card. By way of example, the touch screen may utilize LCD (liquid crystal display) technology and may be capable of displaying a number of lines of characters, for example four lines relating to four bets and additional lines which may, for example, provide an integrated graphic display (e.g., a single line of Chinese characters).

By way of example, associated with the touch screen at a surface 1020 may be suitable indicia such as 1021–1024 for explaining the format of the display. In the specific illustration of FIG. 28, the characters "HV" may represent the initial letters of the name of a race track (e.g., Happy Valley), the next series of characters representing the data (e.g., year, month and day of month). Further characters on the display may relate to the day of the week, the type of bet or the like.

Figure 29:
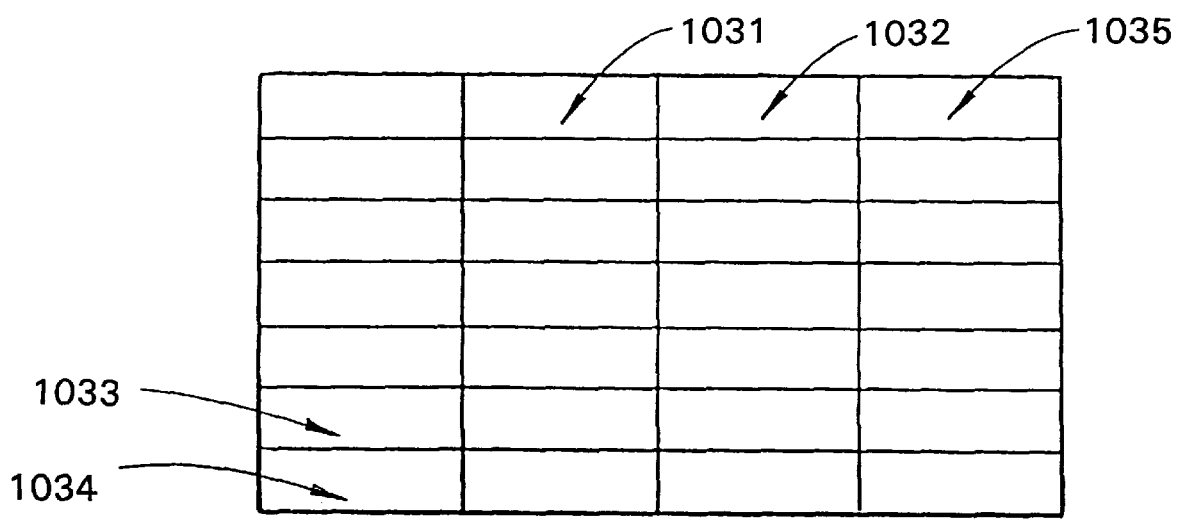
FIG. 29 illustrates a matrix of touch regions for a touch screen such as indicated in FIG. 28.

In the example of a transaction involving betting on a horse race, an exemplary keyboard display for touch screen 1017 is indicated in FIG. 29. In an example where several race tracks may be involved, the identities of respective race tracks may be displayed at locations such as 1031 and 1032 in FIG. 29. Each location may display indicia indicating the programmed significance of the location. Simply by way of example, a prompt message at lines 1033 and 1034 might instruct the user to select the race track where the race to be the subject of a wager is to take place. At the same time indicia representing the two race tracks would appear at 1031 and 1032. The user would then press location 1031 or 1032 with his finger to indicate the identity of the race track. A similar procedure could be followed for identifying the day of the race, the number of the particular horse on which the bet is being placed, the amount of the wager, and so on.

Figure 28:
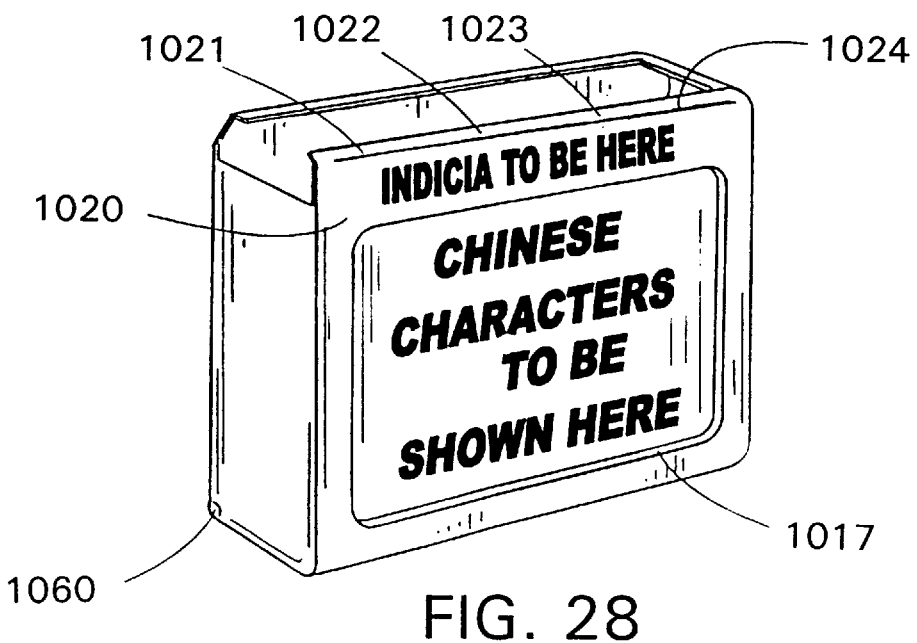
FIG. 28 is a perspective view showing a terminal means in accordance with the present invention and showing an exemplary display including four single lines of characters and at the bottom Chinese characters occupying the height of two character lines of the display.

In the preferred embodiment of FIGS. 27 and 28, the terminal 1010 is provided with an acoustic coupling means 1050 which may serve to couple the terminal with telephone lines, for example. Thus in the case of betting transactions, once the user of the terminal has entered desired bets, for example on a number of horse races, the user may couple the terminal, e.g. via an acoustic coupler, with a handset of a conventional telephone, for establishing two-way telephone communication with a central computer system equipped to deal with the particular type of transaction and to authorize the individual participant. The touch screen 1017 may display suitable prompt messages in establishing the telephone link with the central computer, or the processor of the terminal 10 may itself be programmed to establish the telephone link automatically, for example in response to actuation of a "SEND" location 1035 of FIG. 29. Once communication is established, the processor of terminal 1010 is able to transmit the data stored on the information card 1011 via the telephone link to the central computer system so that the central computer system can verify that the individual is authorized to carry out the relevant transactions. In the case of horse race betting, the information on the particular race and particular horses involved and the other details of the bet would be transmitted to the central computer system for verification and for evaluation of the total amount being bet, for example in relation to the individual's established account balance.

Also in the preferred embodiment as shown in FIG. 28, the housing is provided at a corner thereof with an optical scanner module 1060 which may be utilized as a hand-held bar code scanner, and which also can serve for receiving optical communication via a suitable receiving device. In the case where the terminal utilizes rechargeable batteries, a receiving boot could automatically couple with a charging circuit for the battery means and this boot could also be provided with a host computer or suitable communication to a host computer system such that data from the intelligent card 1011 and from the memory of the terminal itself could be communicated with the host system via an optical link including the scanner module 1060, if desired.

Figure 30:
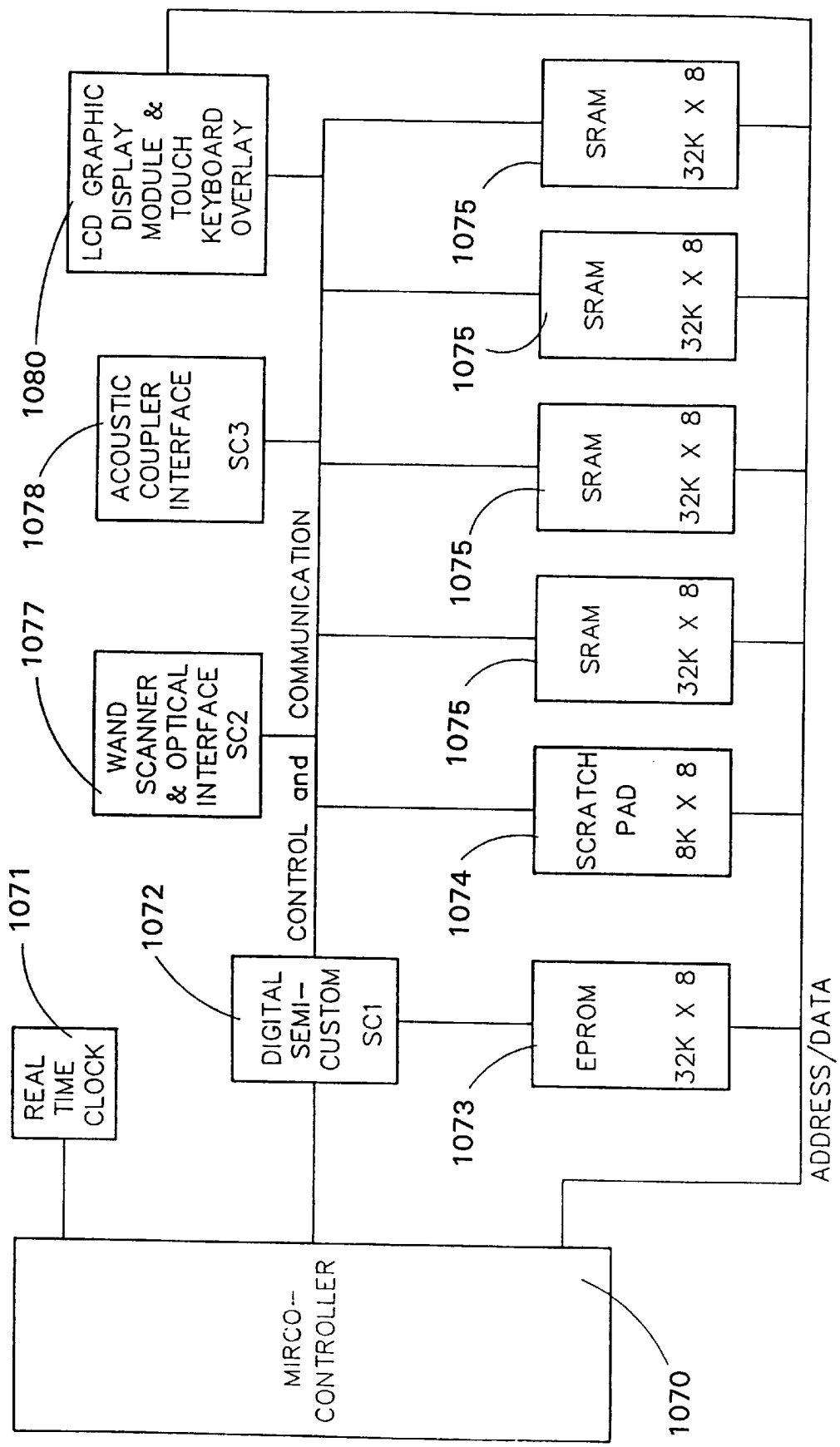
FIG. 30 is a schematic block diagram for illustrating an exemplary processing means occupying the interior of the terminal of FIGS. 27 and 28.

Also as a preferred implementation, FIG. 30 illustrates a suitable processing system for the housing 1010, including a microcontroller 1070, a real-time clock 1071, control and communication circuits 1072, EPROM 1073, random access memory components 1074 and 1075, a wand scanner and optical interface component 1077, an acoustical coupler interface 1078 and a module 1080 for controlling character and/or graphic display of the touch keyboard screen for a particular desired application.

Figure 31:
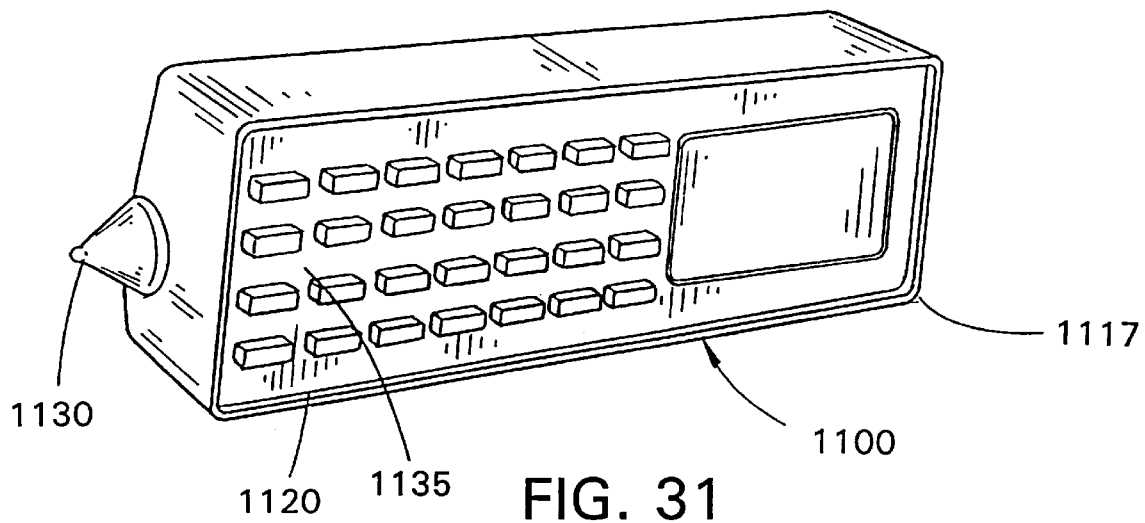
FIG. 31 is a somewhat diagrammatic perspective view showing a terminal which may be utilized particularly for selecting desired functions in a particular application of the terminal of FIGS. 27–30.

By way of example, intelligent information card 1011 may be approximately 3⅜ inches by 2⅛ inches (about 9.5 centimeters by 5.4 centimeters). The dimensions of displays 1017, FIG. 28 and 1117, FIG. 31 are thus approximately comparable to the length and width of the card. (The card thickness is standard and about 1/32 inch). In FIGS. 27–30, the overall dimensions of the terminal 1010 are not substantially greater than the corresponding card dimensions; the thickness is such that terminal 1010 fits in an ordinary shirt pocket. By way of example, the terminal may have a thickness of less than one inch, i.e. less than 2.5 centimeters.

Figure 32:
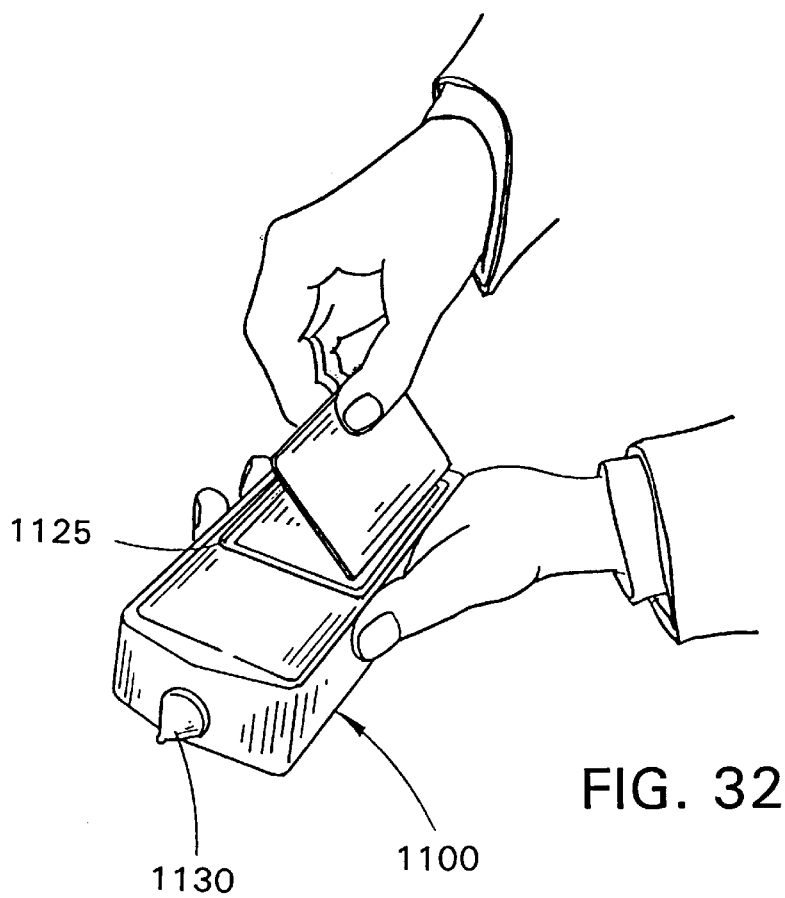
FIG. 32 shows the insertion of an intelligent information card into a receptacle of the terminal of FIG. 31 while the terminal is held by one hand.

In the development of a preferred pocket-size terminal such as indicated in FIGS. 27 and 28, it is sometimes convenient to utilize a larger development terminal such as indicated at 1100 in FIGS. 31 and 32, which may utilize the same size of touch screen 1117, (i.e. two inches by three inches), but may further utilize a highly versatile keyboard 1120, and a much larger memory capacity so that many different features can be tried out for a particular application. At the rear of the touch screen 1117, there may be a receptacle 1125, FIG. 32, for an intelligent information card exactly corresponding to receptacle 1011 of FIG. 27. The terminal 1100 is shown as being provided with an optical scanner module 1130 which may function in the same manner as the module 1060 of the preferred embodiment of FIGS. 27 and 28. In the example of FIGS. 31 and 32, rechargeable batteries may be utilized, and a boot receiving the housing of terminal 1100 may have provision for optical coupling with the computer system of the housing via an optical output means 1135. Optical communication from a host computer system may be via the optical scanner module 130 as in the embodiment of FIGS. 27–30. The housing of terminal 1100 is provided with an acoustical coupling means for telephonic communication corresponding to the acoustical coupling means 1050 of FIG. 27. An exemplary embodiment according to FIGS. 31 and 32 may utilize internal components as indicated in FIG. 33.

Figure 33:
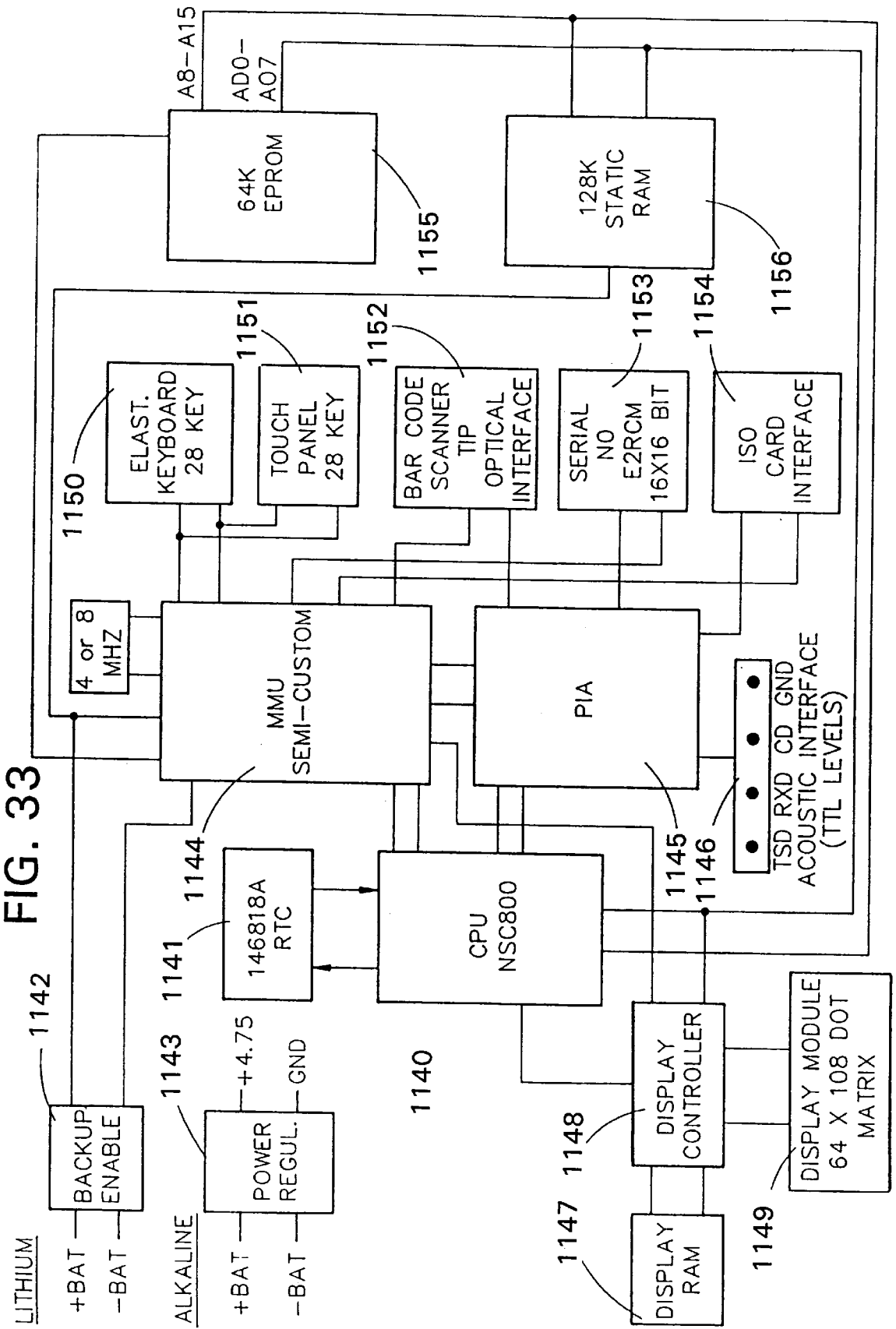
FIG. 33 is a somewhat schematic block diagram for illustrating the electronic processing components which may be utilized with the embodiment of FIGS. 31 and 32.

In the specific embodiment of FIG. 33, components 1140–1156 may have the functions and parameters as indicated by labels for the respective components in FIG. 33.

Description of FIGS. 34 through 40

Figure 34:
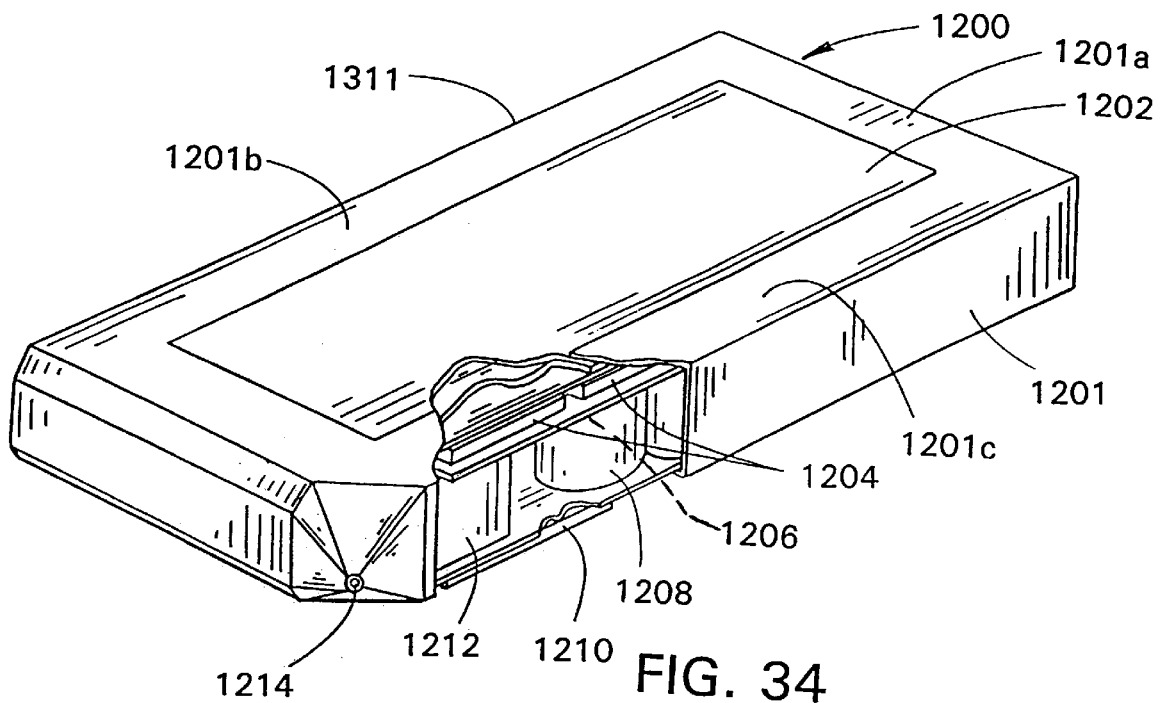
FIG. 34 is a diagrammatic perspective view of a shirt pocket size terminal means in accordance with the present invention, including a scanner tip, and having portions broken away to show internal components.
Figure 35:
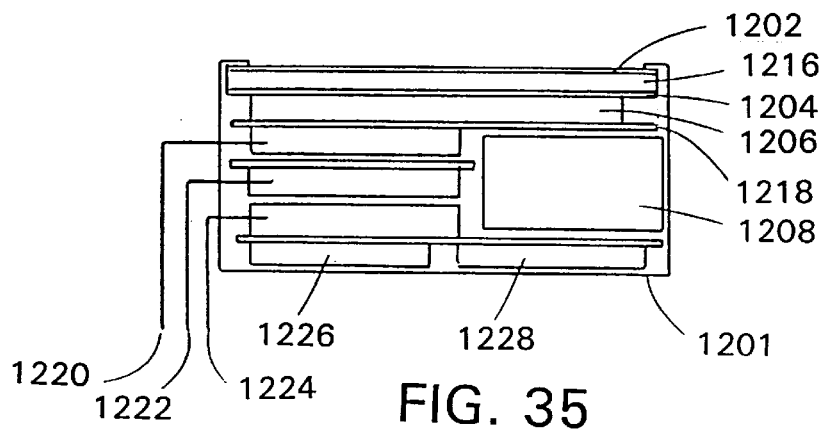
FIG. 35 is a diagrammatic cross sectional view for indicating internal components of the terminal means of FIG. 34.
Figure 36:
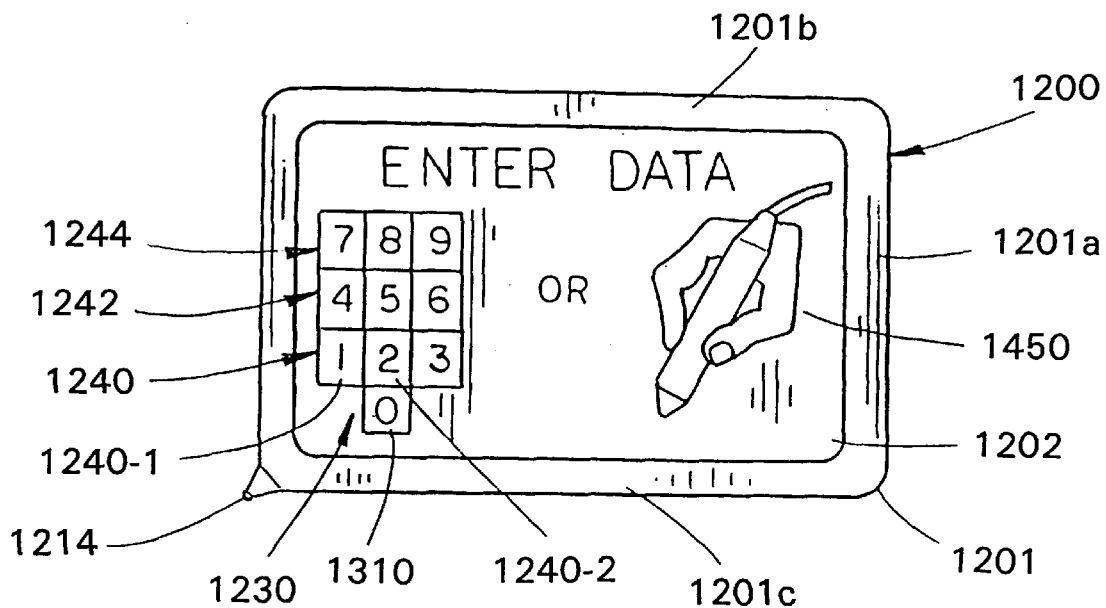
FIG. 36 is a diagrammatic view of a core processor module with touch screen type display and having length and width comparable to a standard credit or debit card and thickness to fit in a shirt pocket.

FIGS. 34, 35 and 36 show a shirt pocket size terminal configuration 1200 generally corresponding to that of FIGS. 27–30, but omitting the card receptacle 1012, terminal 1200 includes the following components:

1201—casing
1202—membrane keyboard
1204—liquid crystal display
1206—display drivers
1208—batteries
1210—real time clock
1212—scanner module
1214—scanner tip
1216—plastic support for membrane keyboard 202 (FIG. 8)
1218—printed circuit board
1220—display/keyboard controller
1222—RAM
1224—microprocessor
1226—ROM-A/D
1228—real time clock, decode circuits Referring to the graphics display of FIG. 36, data input into unit 1200 may be by means of a touch screen display as indicated at region 1230, or by means of a digitizer system for sensing the position of a manually held stylus.

Exemplary characteristics for such a unit are summarized as follows:

V25 CMOS MICROPROCESSOR 8 MHZ
  16 bit arithmetic logic unit
    8086 software compatible
  16K byte mask ROM
    retains VRTX operating system
      diagnostic/power control routines
      sophisticated loader
1 MEGABYTE ADDRESS RANGE
  2 UARTS—
    Full Duplex
      Internal Baud Rate Generators
RAM CMOS STATIC
  1 Megabyte—Less 16K ROM and 512 Internal RAM and SFR
  Holds Application Programs
  Also is Data Storage
  Battery Back-Up (Non-Volatile)
REAL TIME CLOCK/CALENDAR
  Provides Date/Time Information
  Back-Up
PLASTIC LCD DISPLAY
  64×128 Pixel Graphics Dot Matrix
  Built-In ASCII Character Generator
  Programmable Character Capability
  Limited Animation Capability
TRANSPARENT KEYPAD
  50 Keys in 5×10 Matrix
  Defined By Display For Location, Size, & Legend
BUILT-IN WAND TYPE SCANNER
  User Input Capability In Addition To Keypad
RECHARGEABLE BATTERIES
  Nicad or Lithium
  Complete Control/Monitor Via Software
  Offers Highly Reliable Remaining Battery Operating Time
  Gauge
  Provides power to RAM+RTC Under All Conditions
I/O CONNECTOR
  8 Pin
  Programmable
  Only Ground and Charge Pins Dedicated
  5 Volt Interface
  Never Powers Peripherals
ENVIRONMENTALLY SEALED
  Plastic Case is Glued or Sonic Welded
  Repair Procedure Is To Cut Case Away and Replace
  Can Be Submerged Discussion of FIGS. 34, 35 and 36

The main attractions of a V25 micro-controller for the system of FIGS. 34, 35 and 36 are that it is CMOS, very high speed, and sixteen bits internal, with a nice collection of built-in peripherals. The fact it is 8086 software compatible means that VRTX (versatile real-time operating system) can easily be ported to the V25, with the addition of new I/O drivers. VRTX is a multi-tasking operating system, so the battery control circuitry software will run at a fixed priority level at all times as will diagnostic routines. Applications will be moved in and out as necessary.

The one megabyte of CMOS static RAM and the RTC are always supplied power. When battery voltage drops below a selected value, e.g., 4.5 volts, (the fuel gauge will read zero at this point) the unit shuts down and cannot be worked unless proper power is supplied to it on its charge pin. The unit will appear to shut down when not actively doing anything; however, touching the keypad will bring it to use. (Also I/O activity will wake it.)

The plastic LCD display is light in weight and relatively immune to mechanical injury. The graphics capability is advantageous so that the display can define the keypad, key location, size, and legend. It will display icons and provide vertical and horizontal movement. The display controller can work from a page larger than can be displayed and move around in the page without rewriting the display memory. The ability to load-in custom character sets lets the unit perform I/O suitable to the country in which it is used (just by downloading new software).

The I/O may be strictly serial in operation; however, besides the two UARTS of the V25 there will be an 8530 SCC (serial communication chip) which will provide two more serial channels. This enables protocols to be run synchronously as well as asynchronously. The 8530 will provide bit, byte, and A-Sync communication at a high data rate—up to 1.5 megabytes per second.

Pursuant to an early concept of peripheral shells, the unit can stand alone in a package tracking, meter reading, tree counting or warehouse/store inventory environment, but possesses a great amount of power and with more peripherals could well become the next generation of low and mid-range terminals. A shell would be used to envelope the unit and house the external peripherals and additional power source they would require. A hand-held computer unit could be composed of a keyboard and a fifteen pin I/O interface with the whole under keyboard area filled with alkaline batteries to power the peripherals and the V25 core unit.

Similarly, a larger display, a printer, a permissive modem, an RF link module and other peripherals could be shelled around the core unit of FIGS. 34, 35 and 36.

By way of example, the terminal unit of FIGS. 34, 35 and 36 may have a width of the order of two inches (e.g. 2⅛ inches), a length of the order of three inches (e.g. 3⅜ inches) and a thickness of the order of one inch (e.g. ¾ inch).

In a digitizing input mode of operation of the unit of FIGS. 34, 35 and 36, successive character entry fields may be defined in a line across a screen area such as indicated at 1240. For example, the rectangle 1240-1 (presently containing the numeral "1") could receive a first character, e.g. manually entered as a series of strokes by means of a stylus. The unit could produce a graphical display in the form of lines corresponding to the paths of the successive strokes, e.g. at the line 1242 above line 1240. The program could analyze the input on the basis of the sequence in which the strokes were entered, rates of stylus movement, and so on, so as to interpret the intended character with substantial accuracy. The unit may display its interpretation of a manual character entry by displaying the corresponding stored character from its repertory at a line 1244, e.g., as soon as there is a pause of selected (programmable) duration. If then the user begins drawing a new character, e.g., in a second field 1240-2, the program will assume that its interpretation is correct and will automatically store it. If a given field is skipped, a space may be correspondingly automatically stored. The size of each character field and other parameters (such as pause duration) can be selected to have values convenient to the individual user, during a user set up mode, with suitable prompts from the display. The processor, during manual character entry, can be set to a learning mode where it seeks to adapt as accurately as possible to the writing style of a given user. Such learning mode can be switched off whenever desired, as a further user set up mode parameter. A similar procedure could be followed for processor learning in the case of a speech input module.

Figure 37:
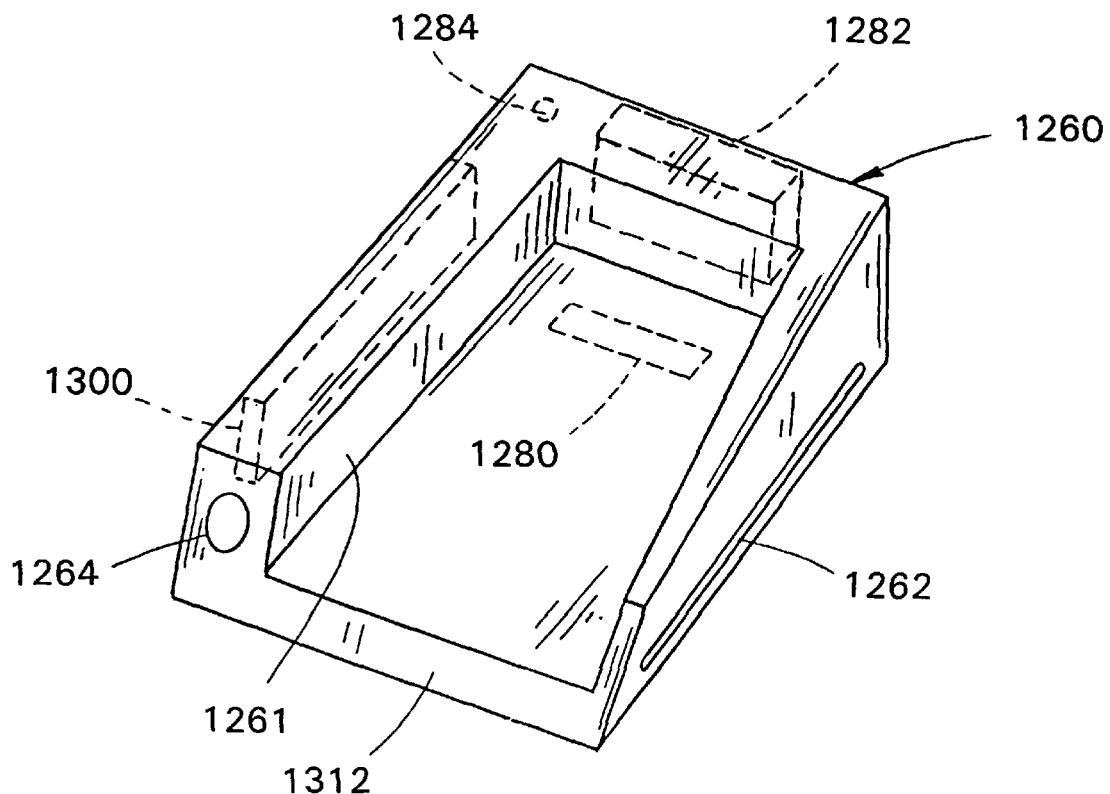
FIG. 37 is a diagrammatic perspective view showing an exemplary shell configuration for readily receiving the core processor module of FIG. 34, 35 and 36, to form a plural module terminal system, e.g., adapted for direct store delivery accounting.
Figure 39:
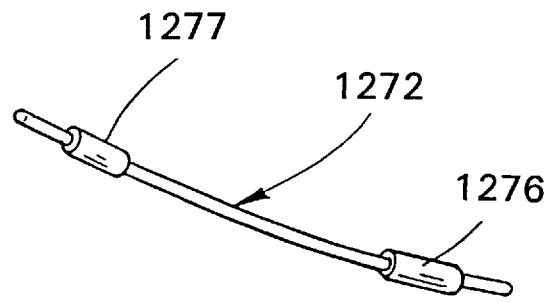
FIG. 39 shows an exemplary coupling means for coupling the system of FIGS. 36 and 37 with the store terminal of FIG. 38.
Figure 38:
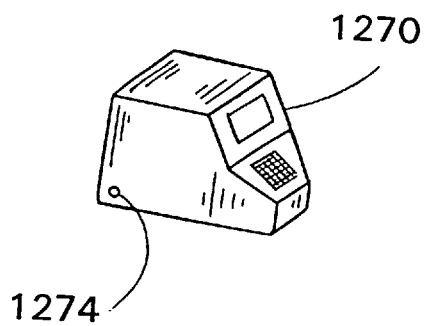
FIG. 38 shows a store terminal device for coupling with the system of FIGS. 36 and 37.

FIG. 37 illustrates a shell module 1260 having a receptacle 1261 for receiving a processor core module such as 1200, FIGS. 34, 35 and 36. Module 1260 may cooperate with module 1200 to provide a direct store delivery terminal. The terminal may have a card slot 1262 for receiving a conventional smart card containing the information related to a delivery transaction, and may have an input/output coupler such as a one-fourth inch phone jack 1264 for coupling with a store device 1270, FIG. 38, via a connecting link such as 1272, FIG. 39. Phone jack 1264, FIG. 37, and phone jack 274, FIG. 38, may be one-fourth inch three-conductor phone jacks for receiving cooperating phone plugs 1276, 1277 of link 1272.

The coupling between a smart card and a receiving terminal (such as 1260, FIG. 37) is illustrated in the third figure at page 45 of an article entitled, "Smart Credit Cards: The Answer to Cashless Shopping" in *IEEE Spectrum*, February 1984 (pages 43–49) and this article is incorporated herein by reference by way of background. A similar coupling arrangement is preferred between modules 1200 and 1260.

By way of example the core module 1200 may have an array of eight I/O contacts similar to those of the smart card of the third figure at page 45 of the *IEEE Spectrum* article just referred to. These contacts would mate with cooperating contacts at a contact region such as indicated at 1280 of module 1260. Charge and ground contacts of module 1200 could be of fixed function, while the other contacts could be programmable as serial channels, clocked data, analog inputs or outputs, or event inputs and outputs.

Module 1260 may have a battery compartment 1282 for receiving alkaline batteries for energizing suitable interface circuitry such as represented in the above-referenced third figure. A telephone jack may be located at 1284 for coupling with the modem of the referenced third figure. Module 1200 may couple with the interface circuitry of module 1260 via contact region 1280 in the same way as represented in the referenced third figure for the case of "Peripherals" and/or as represented for the case of a "Display", and "Keyboard", for example. A customer keypad may be coupled with module 1260 in the same way as represented in the referenced third figure.

Typical shells for forming hand-held terminals with module 1200 could be printers, laser bar code readers, RF modules, smart card interfaces (as at 1262, FIG. 37), disk systems, full travel keyboards, larger displays, local area network interfaces, etc. A hand-held printer device which could serve as a shell for the processor module 1200 is available commercially from Norand Corporation, Cedar Rapids, Iowa, and is referred to as a 40-column hand-held printer for use in product distribution systems, and is described in a brochure designated "960-182-0485" of Norand Data Systems.

DISCUSSION APPLICABLE TO ALL EMBODIMENTS

The concept of a plural module hand-held data processing system enables the use of a single computing engine to drive an entire product line. The basic or core module may comprise a self-contained limited input/output device with extreme reliability and flexibility. While the core module can serve many markets directly, many more can be met by using peripheral device shell modules which may integrate the core module into its confines. An internal fixed operating system protects the critical core module functions while allowing user applications to execute in a multi-tasking real time environment.

Of prime importance are the two requirements of low cost and tremendous capability. The lowest possible cost is achieved by use of technology yielding low manufacturing costs at high volumes. High volumes are achieved when a single product is flexible enough to perform well in multiple markets.

Figure 40:
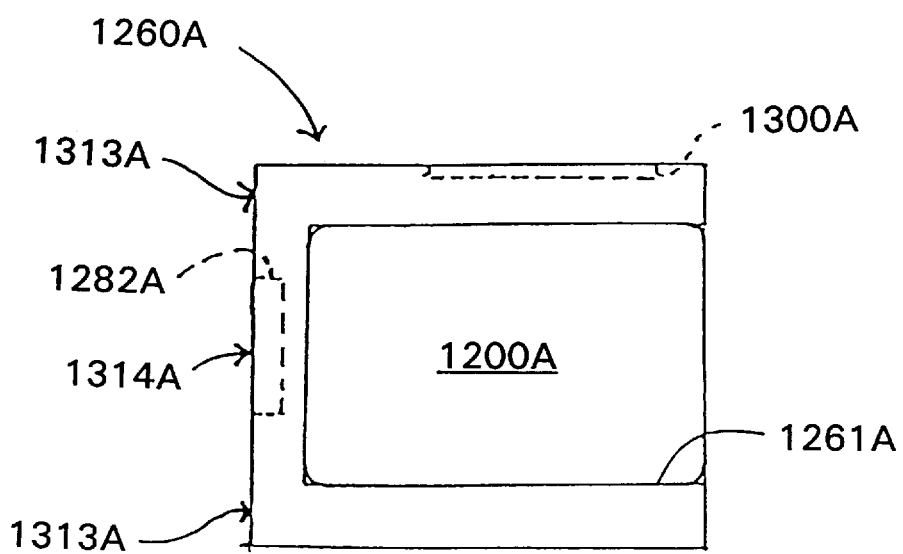
FIG. 40 shows an exemplary plural module terminal system comprised of a shell portion having a processor and battery and also having optical indicia reader components and light output components, and shown with a display and manual data input module assembled in the shell receptacle.

Of particular interest are flexible shirt pocket size plural module configurations which enable data input independently of a conventional keyboard. For example, a digitizer tablet input such as described with reference to FIGS. 34–39 is also applicable to the embodiments of FIGS. 27–33. Various optical type scanners are also of substantial utility for quick, easy and highly accurate input of existing printed data, e.g., bar codes, text, and graphical information. Instant type optical readers which may be integrated into a hand-held shell module according to the present invention are disclosed in an application of Danielson and Durbin, Ser. No. 07/894,689 filed Aug. 8, 1986, now U.S. Pat. No. 4,877,949, issued Oct. 31, 1989, and the disclosure including the drawings of this incorporated Danielson and Durbin application (07/894,689) are incorporated herein by reference in their entirety as illustrating arrangements which may be embodied in a peripheral shell such as indicated at 1260A in FIG. 40, which is analogous to shell 1260 in FIG. 37. For the embodiments of this incorporated Danielson and Durbin application (07/894,689), the optical output means in FIG. 40 may be at opposite ends of battery compartment 1282A (corresponding to compartment 1282, FIG. 37) at locations such as indicated at 1313A in FIG. 40, while the reflected light optics and processing components may occupy the region below compartment 1282A FIG. 40, and a region replacing card slot 1262, FIG. 37, such location being designated by reference numeral 1314A in FIG. 40. The control and processing means of said Danielson and Durbin incorporated application could be embodied in the basic core module such as represented at 1200 in FIG. 34, or, as represented in FIG. 40, the display and manual data input means could be provided by a separate module 1200A in receptacle 1261A in FIG. 40, while a basic processing module occupied a greatly reduced space such as represented at 1300A in FIG. 40, the processing module being inserted into a receiving well via a removable cover as is commonly the case with battery compartments such as 1282 in FIG. 37. Such a cover, could incorporate resilient means so that when the cover was latched, a core processing module at location 1300, FIG. 37 would have its eight metal contacts pressed against cooperating contacts of the receiving shell module such as 1260. Referring to the article "Smart Cards" by Robert McIvor in *Scientific American*, November, 1985, at page 153, an eight contact terminal is shown in association with a single chip microprocessor system, from which it will be apparent that the width of the smart card could be reduced from fifty-four millimeters to twenty millimeters and fit edgewise into the region 1300 (vertically as viewed in FIG. 37). For such a strip type core module, the thickness could be substantially greater than the standard card thickness of 0.76 millimeters, for example ten millimeters.

The core module may incorporate the components of FIG. 30 or FIG. 33, or components such as 1077, 1078 and 1080, FIG. 30, may be incorporated into a peripheral device module, for example one fitting into receptacle 1261 of shell module 1260, the core module incorporating the remaining components. Similarly as to FIG. 33, components such as 1147, 1148, 1149, 1150 and 1151 can be incorporated into a module fitting into receptacle 1261, while component such as 1152 and 1154 may be incorporated into the shell module 1260, and the remaining components incorporated into the strip core module fitting into region 1300.

Preferred features of an exemplary core module such as might fit into receptacle 1012, FIG. 27, receptacle 1125, FIG. 32 or region 1300, FIG. 37, are as follows:

(1) User immune real-time multi-tasking operating system. The multi-tasking ability allows system programs of the core module to run in the background and never lose control. This ensures proper operation of the user's application(s) and system status availability.

A program known as VRTX (Versatile Real-Time Executive) and IOX (Input/Output Executive), available commercially, together with input/output drivers, monitors and control programs preferably compose the operating system stored in the core module (for example in read only memory ROM).

(2) A microcomputer compatible with personal computer architecture, e.g., an NEC V25 microcomputer with 8086 type architecture, supports the implementation of the operating system in that VRTX and IOX are 8086 oriented. A high integration CMOS construction directly supports the lower power standby and shut down features which are desired for the core module versatile interface adapter (VIA) software control. A one megabyte addressing range would be considered a minimum for hand-held units, along with a sixteen bit internal arithmetic logic unit.

(3) With a one megabyte memory, for example, read only memory necessary to contain the operating system would require about eighty kilobytes. All the rest of memory in the addressing range may be CMOS static random access memory used for applications.

(4) The core module preferably provides clock and calendar functions, and a hardware real time clock chip is compatible with very low power requirements.

(5) Battery operation is presently a key hardware aspect of a core module, and this is the main reason VRTX should provide immunity from the user. In order to offer unparalleled reliability in the field, the power control system should never be tampered with except under operating system control. The core module may use nickel cadmium rechargeable batteries. Such a core module preferably implements the intelligent battery system such as disclosed in U.S. Pat. Nos. 4,455,523, 4,553,081 and in a pending application of Steven E. Koenck, et al., U.S. Ser. No. 876,194, filed Jun. 19, 1986, now U.S. Pat. No. 4,709,202. The intelligent battery system allows a very accurate "fuel gauge" for advising the user of remaining battery capacity. Fast charge capability offsets the lower capacity batteries which are preferably used in the core module. All of the RAM, the RTC and internal registers, e.g., of the V25 are battery backed up, even with the unit shut down.

Battery monitoring will also indicate possible problems before they become serious and, combined with other system monitoring, will provide unprecedented forewarning of possible impending failure. All devices will ultimately fail, but it is extremely advantageous if a unit can be removed from service before a hard failure occurs.

(6) The core module should be able to communicate with a host and with peripheral devices, for downloading of the application programs into the core module and for communicating with all types of input/output devices such as those referred to herein. Extensive flexibility in the communication protocol is provided for example by using two high speed serial channels capable of being programmed as asynchronous, byte synchronous or bit synchronous. Eight input/output contacts provide electrical connection to the outside. The charge and ground contacts may be fixed while the other contacts may be programmable as serial channels, clocked data channels, analog inputs or outputs, or event inputs and outputs. The concept of using peripheral shell modules for selective coupling with the core module offers complete expansion capability with minimal development time to enter new markets. Typical shell modules could comprise graphics LCD display means providing a touch keyboard, digitizer tablet means, printers, laser bar code readers, RF modules, smart card interfaces, disk systems, full travel keyboards, larger displays, local area network interfaces, et cetera. Optionally, as illustrated in FIGS. 34, 35 and 36, for example, the core module may have a built-in minimal input/output capability such as may be achieved by using a graphics LCD display on one face of the core module for output and a touch responsive keyboard directly behind and defined by the display. The display, for example, may comprise 64×128 pixels, or eight lines by twenty-one characters, and may support any character set that can be defined. This is ideal for foreign applications. Since the keyboard is defined by the display, it will naturally be in the same language. The display (and keyboard) may be backlighted by a built-in electroluminescent panel. Many stand-alone applications for such a core module would require bar code scanning and thus a built-in scanner is illustrated at 1212, 1214, FIG. 34. Such a display would have the ability to use icons (pictorial images) as labels for keyboard locations, and to change them as the application requires.

A core module such as shown in FIGS. 34 and 35 could have a housing comprised of two die cast magnesium shells, glued together. Preferably there are no holes through the housing, so that the unit is submergible. It is ideal for meter reading, package tracking, timber inventory, or any environmentally demanding application. Internal construction is preferably of one continuous flexible printed circuit board. This eliminates connectors, weight, and sources of failure. Preferably even the batteries are soldered in. The core module may withstand being dropped to a concrete surface from seven feet without functional damage. A minimum number of integrated circuits will reduce the cost and increase the reliability of the core module.

Where the graphics type keyboard displays icons representing physical objects, it will be apparent that such physical objects may be represented by a single code word such as utilized to represent any other keyboard entry. Such code may be translated into a corresponding graphical icon type display by means of a suitable read only memory or the like. A similar situation can prevail for example where shorthand characters are input to respective receiving regions such as indicated at 1240-1 and 1240-2 in FIG. 36. Spoken words related to a given application may likewise be represented by single code words in random access memory, and translated via read only memory or the like into corresponding strings of characters for display, or for synthesized speech output. As previously mentioned, if the letter P is related to a number of objects for a given user application, the user may input the letter "P" at a region such as 1240-1 or 1240-2, FIG. 36, whereupon the input strokes may be repeated at a corresponding location in row 1242, and possible interpretations, either graphically, or as character strings, may be sequentially presented, e.g. at row 1244. When the correct interpretation is displayed, the user may touch a suitable region of the display such as indicated at 1310 to indicate approval of the current displayed interpretation.

In preferred hardware for implementing the illustrated embodiments, all memory and input/output accesses are allowed when the system is in the supervisor or system mode. On the other hand, any access by an application program to any area outside of its work and program areas (as assigned by the system) must immediately return control to the operating system for proper action. A microcomputer such as the V25 is advantageous because of its non-multiplexed bus, and built-in software-controlled power down. It would also be advantageous to have a built in hardware boundary checking of applications being run (as in the 80286). A digital semi-custom chip can accommodate this function externally.

A V25 internal timer may be used as the VRTX tick. Entrance to VRTX is through the NMI input of the V25. This is the only input (besides reset) that not only can wake the chip up if it's in a sleep mode, but also cannot be shut off by an application (thus disabling VRTX). Many sources may logically OR into NMI. The real-time clock, serial channels, charge indicator, and keyboard are some of these. Most of these should be programmable as to whether they can activate NMI.

The random access memory can be built as a separate module. For example eight 128 kilobyte chips and decoding may be in the module. A module select line should also be included since the module is expected to be useful in other product lines in multiple configurations. Standby currents of fifteen microamperes at two volts are being presently considered.

As real-time clock, an Intersil 7170 may be used since it is guaranteed to operate at two volts, the same as for RAM. The RTC and RAM are all battery backed up once low battery condition is entered.

For a shell module containing a display, a plastic LCD dot matrix display from Polaroid Corporation may be used. A display size of 64×128 pixels with eighteen mil pitch gives eight lines of twenty-one characters each (5×7 font). The controller may be the Epson E-1330. This is a graphics controller that can support three separate planes or pages for the screen and can combine them in many different ways. The planes can be graphic or characters. The characters can come from the internal ROM or RAM loaded by the application. A graphics plane could create boxes and a character plane could put legends in them. The E-1330 uses S-MOS 1180 and 1190 drivers to run the columns and rows (respectively) of the display. They apply a ten to fifteen volt bias on the display. This may be obtained from a plus five volt supply in the core module in combination with a variable minus twelve volt supply in the shell module and providing two to three milliamperes for the display. This supply is controlled by the E-1330 as for on-off but the V25 will be responsible for controlling the actually used voltage based on the temperature of the core module and user input information. A fast recovery crystal is preferred to minimize the time delay upon release of pressure (e.g. by the manual entry stylus or finger). Using a fast recovery plastic LCD display enables the user to press through the display and activate a keyboard behind it. The display is used to define the keyboard or provide the "overlay". This gives the advantage of not only being able to continually change the keyboard as the application requires, but if the display is programmed in a foreign language such as Ethiopian, the keyboard is in the same language. Putting the keyboard behind the display allows for an opaque design of low contact resistance. The keyboard may be a 5×10 matrix (fifty keys) software configurable to be combined for any shape or icon style key defined by the display.

A soft (but tough) electroluminescent panel is preferred for backlighting, the keyboard being activated by pressing through the display and the electroluminescent panel. A tremendous advantage here is that not only is the display operable at night, but so is the keyboard (which is further programmable!)

A built-in wand scanner such as indicated in FIG. 34 preferably has a sapphire lens in a stainless steel or other hard metallic housing. Testing has shown that sapphire tipped wands will chip concrete before they break. It is preferable to make the chip very rugged rather than to make it easily replaceable. The wand housing is preferably clamped (and glued) right into a casing such as 1201. The light source may be a near infrared visible LED to be able to read non-carbon inks and let the user know it is on, yet take advantage of the infrared capacity to read through many stains and smudges. Preferably the scanner is capable of reading in direct sunlight, and in this connection reference may be made to an application of Eric J. Danstrom, U.S. Ser. No. 07/044,820 filed Apr. 30, 1987, now abandoned, the disclosure including the drawings of which being incorporated herein by reference in its entirety.

An initial approach of a four N-cell nickel cadmium battery pack with each cell treated individually is now less preferred than a one cell "battery pack". The one cell pack requires a converter to boost the voltage. The single cell has many more advantages. No cell matching is required. No conditioning cycles are required, and it is not necessary to be concerned about cell voltage depression. A single converter to step up the voltage for a shell display module would be suitable, with a single switching regulator (current mode) to charge the cell from a much wider input range (e.g. from four to twenty volts). Fast charging on the order of 1C (or perhaps 2C) can be achieved since continuous monitoring of cell voltage and temperature curves (with respect to previous cell conditions) will allow proper charging with no risk of overcharge. This same monitoring applied to discharge as well, provides a very accurate "fuel gauge". Rechargeable lithium batteries may be considered, but the general recommended operating requirements do not match the preferred embodiment as described herein as well as nickel cadmium batteries. The charging line will have a diode blocking reverse current flow and inserted prior to the input/output terminal (for protection). This same single battery pack may also serve as the backup battery. The operating system may operate to equate ten percent or twenty percent of remaining capacity in the battery pack to "zero" on the "fuel gauge" being displayed to the user.

In a preferred embodiment a surface type connector as used in smart cards has advantages in that it takes up very little space and cannot clog with dirt (can be wiped clean, e.g., during interconnecting of respective modules). Further, a surface type connector avoids the use of a cable. To maintain input/output protection and immunity from the environment, each core module may have all of its programmable input/output terminals disabled. The charge pin of a core module may be used to determine the presence of a peripheral shell. Each peripheral may have its own power supply and may or may not provide charge to the core. A peripheral module must at least provide a logic ONE (greater than one volt) to the charge pin in order to signal its presence. If such a logic ONE is present, the core module will determine if the peripheral module can charge it by enabling the charge regulator on the charge pin. If the level pulls low, it will indicate that the peripheral module is meant to only communicate with the core module but not charge it.

Preferably immediately inside of the case of a module will be an electrostatic discharge (ESD) resistor/diode clamp protection scheme. From there the I/O lines may go to a crosspoint type multiplexing circuit. Since in a preferred embodiment any of the six remaining pins can be inputs or outputs and connect to A/D channels in the module, voltage measurements could be made in a peripheral, e.g., by the core module and appropriate messages displayed to the user as to peripheral readiness and power levels.

The eight contacts of each module could be gold plated or the like such that they would be very conductive and yet tough. The contacts may be molded in a plastic insert that is glued into a hole at a location such as indicated at 1280, FIG. 37, for example.

A case such as indicated at 1201 in FIG. 34 can be in two pieces a front half and a back half, and the back half may have one rectangular flanged hole in which to glue the oppositely flanged I/O contact plate. The back half may be glued with conductive epoxy glue to the top case half, The top case half may have a large rectangular opening in which the display/electroluminescent panel/keyboard assembly fits. There may be a shelf behind this assembly for support with a glued-in bezel to seal the display and other components into the depression.

In an embodiment such as FIG. 34, preferably the mating corner portions of both halves may be specially molded to clamp around the scanner housing. When finally glued together, the resulting casing 1201 may be completely sealed. It may be water and gas tight, but preferably not hermetically sealed where the display plastic is permeable. Purging the casing such as 1201 with dry nitrogen at the time of assembly and sealing may increase reliability. Operation may be from somewhat below sea level (e.g. actually under water) up to 10,000 feet. The case such as 1201 may have a size a little over three inches long by a little over two inches deep by about three-fourths inch thick, for example.

A module such as indicated in FIGS. 34, 35 and 36 would be suitable by itself for fields such as package tracking, price checking, inventory control, meter reading, consumer comparative shopping, et cetera. Various countries may require individually designed modules to couple with the module or module assembly of FIGS. 34, 35 and 36, in order to meet national requirements and the like, e.g., with respect to such peripheral devices as modems, power supplies and so on.

The core module previously referred to as being insertable into a space such as 1300, FIG. 37, may also be insertable into a similar space in the module of FIGS. 34, 35 and 36, and may represent a standardized basic processing module having the real-time multi-tasking operating system and other characteristics previously described herein.

It will be apparent that many modifications and variations may be effected without departing from the scope of the teachings of the present disclosure. For example, scanner tips such as indicated at 1060, FIG. 28, or at 1214, FIG. 34, may be adapted to left-handed users, by inverting the contents of the display. Thus, if tip 1214, FIG. 36, would be at the lower left with an upright display as shown in FIG. 36 for right-handed manual data entry, the module 1200 might be turned by a left-handed user so that the tip 1214 was at the upper right, and the contents of the display inverted.

Figure 41:
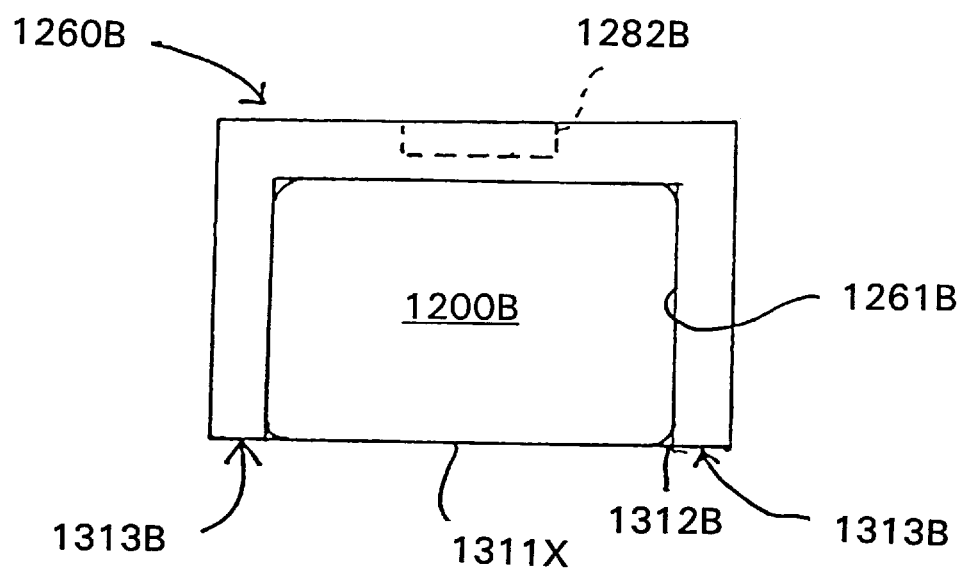
FIG. 41 shows another exemplary plural module terminal system comprising a shell portion having battery and light output components and a module assembled therewith containing optical indicia reader components.

Description of FIG. 41

Reference is made pursuant to 35 U.S.C. Section 120 to Arvin D. Danielson and Dennis A. Durbin application for patent Ser. No. 07/894,689 filed Aug. 8, 1986, now U.S. Pat. No. 4,877,949, issued Oct. 31, 1989, and the disclosure of the specification, including the claims, and the drawings of said application are hereby incorporated herein by reference.

A module such as shown at 1200B in FIG. 41 may have a non-contact essentially instantaneous bar code scanner, e.g., at a long edge such as 1311X in FIG. 41. Flash illumination where needed for the instantaneous bar code reader could be provided by a receiving shell 1260B such as shown in FIG. 41. The shell could contain the battery power for the flash illumination means in the shell and also for any LED marker light sources associated with the photodiode array of the processor module. A series of light emitting diodes at locations indicated at 1313B in FIG. 41 could be used for each of the flash illumination sources of the second and third figures of the incorporated patent application Ser. No. 07/894,689, and such LEDs could all be energized with simultaneous electric pulses, or the pulses could be supplied in quick succession to essentially simulate an instantaneous flash. Where the long edge 1311X in FIG. 41 contains the scanner window for receiving a reflected bar code image, the receptacle 1261B in FIG. 41 could be shaped so that edge 1311X in FIG. 41 faces frontally, and a frontal face (of a greater dimension than in FIG. 37) such as 1312B of the shell module 1260B in FIG. 41, would contain the flashable light source means, located as at 1313B in FIG. 41, for example. The processor module and shell, when assembled, would be hand held in operation, and could be of overall size to fit in a shirt pocket.

It will be apparent that many further modifications and variations may be effected without departing from the teachings and concepts of the present disclosure.

What is claimed is:

1. A portable battery-powered hand-held data processing device, comprising:
    (a) a user interface system, located on the portable battery-powered hand-held data processing device;
    (b) an indicia reader input system, located on the portable battery-powered hand-held data processing device; and
    (c) a processing system, comprising
        (i) a computerized processor, located within a housing of the portable battery-powered hand-held data processing device, for controlling said user interface system and said indicia reader input system, and
        (ii) a multitasking operating system designed to run on said computerized processor and capable of executing essentially concurrently a wide range of computer processes.

2. The portable battery-powered hand-held data processing device according to claim 1, wherein said multitasking operating system executes battery monitoring instructions and diagnostic routines, at fixed priority levels, while concurrently executing application programs under extended portable operating conditions.

3. The portable battery-powered hand-held data processing device according to claim 1, wherein said multi-tasking operating system executes battery monitoring instructions.

4. The portable battery-powered hand-held data processing device according to claim 1, wherein said multi-tasking operating system executes diagnostic routines.

5. The portable battery-powered hand-held data processing device according to claim 1, wherein said indicia reader input system is an optical indicia reader.

6. The portable battery-powered hand-held data processing device according to claim 1, wherein said indicia reader input system is a laser scanner.

7. The portable battery-powered hand-held data processing device according to claim 1, further comprising a removable smart card.

8. The portable battery-powered hand-held data processing device according to claim 1, wherein the data processing device is of a size so as to be readily contained in a shirt pocket.

9. The portable battery-powered hand-held data processing device according to claim 1, wherein said user interface system further comprises a digitizer input receiving input from movement of a stylus.

10. The portable battery-powered hand-held data processing device according to claim 1, further comprising a shell module giving the data processing device additional functionality.

11. The portable battery-powered hand-held data processing device according to claim 1, wherein said user interface is a graphical user interface displaying graphical information to a user.

12. The portable battery-powered hand-held data processing device according to claim 1, wherein said indicia reader input system is a non-contact reader reading data without coming into physical contact with the indicia being read.

13. The portable battery-powered hand-held data processing device according to claim 3, further comprising a fuel gauge.

14. The portable battery-powered hand-held data processing device according to claim 10, wherein said shell module comprises a printer.

15. The portable battery-powered hand-held data processing device according to claim 9, wherein said digitizer input accepts handwritten input.

16. The portable battery-powered hand-held data processing device according to claim 15, wherein the data processing device interprets handwritten input.

17. The portable battery-powered hand-held data processing device according to claim 9, wherein said digitizer input comprises a learning mode adapting the data processing device to the handwriting style of a given user.

18. The portable battery-powered hand-held data processing device according to claim 1, wherein the data processing device serves as a computing engine to any of a family of peripheral devices.

19. The portable battery-powered hand-held data processing device according to claim 1, wherein said indicia reader input system is an instant-type reader.

* * * * *